US012551202B2

(12) United States Patent
Jensen et al.

(10) Patent No.: US 12,551,202 B2
(45) Date of Patent: Feb. 17, 2026

(54) BIOPSY APPARATUS HAVING A PIERCING MODULE

(71) Applicant: Bard Peripheral Vascular, Inc., Franklin Lakes, NJ (US)

(72) Inventors: Angela K. Jensen, Phoenix, AZ (US); Soren F. Orts, Virum (DK); Soren Christensen, Allerod (DK)

(73) Assignee: Bard Peripheral Vascular, Inc., Franklin Lakes, NJ (US)

( * ) Notice: Subject to any disclaimer, the term of this patent is extended or adjusted under 35 U.S.C. 154(b) by 940 days.

(21) Appl. No.: 17/773,794

(22) PCT Filed: Nov. 19, 2020

(86) PCT No.: PCT/US2020/061295
§ 371 (c)(1),
(2) Date: May 2, 2022

(87) PCT Pub. No.: WO2021/102150
PCT Pub. Date: May 27, 2021

(65) Prior Publication Data
US 2022/0387006 A1    Dec. 8, 2022

Related U.S. Application Data

(60) Provisional application No. 62/939,342, filed on Nov. 22, 2019.

(51) Int. Cl.
*A61B 10/02* (2006.01)

(52) U.S. Cl.
CPC ...... *A61B 10/0283* (2013.01); *A61B 10/0275* (2013.01); *A61B 2010/0208* (2013.01)

(58) Field of Classification Search
CPC ............ A61B 10/0283; A61B 10/0275; A61B 2010/0208; A61B 10/0096
See application file for complete search history.

(56) References Cited

U.S. PATENT DOCUMENTS

| 6,261,241 B1 * | 7/2001 | Burbank ................ A61B 90/17 606/45 |
| 6,592,530 B1 * | 7/2003 | Farhadi .............. A61B 10/0275 600/568 |

(Continued)

FOREIGN PATENT DOCUMENTS

| EP | 3000403 A1 | 3/2016 |
| JP | 2005527267 A | 9/2005 |

(Continued)

OTHER PUBLICATIONS

International Search Report and Written Opinion dated Feb. 16, 2021 pertaining to International PCT application No. PCT/US2020/061295.

(Continued)

*Primary Examiner* — Rene T Towa
(74) *Attorney, Agent, or Firm* — DINSMORE & SHOHL LLP

(57) ABSTRACT

A biopsy apparatus includes a piercing module having a probe drive slider coupled to a probe carrier body of a biopsy probe assembly, and has a primed position and a fired position. A nut housing has a home position and an extended position. A drive spindle is drivably coupled to a motor driveshaft, and is coupled to the nut housing. A firing spring is interposed between a motor housing and the probe drive slider. A release arm is pivotably coupled to a piercing module frame. When the probe drive slider is in the primed position and the release arm is in a latch position, the release arm is positioned to engage the probe drive slider to hold the probe drive slider in the primed position. A release slider releases the release arm from the latch position when the nut housing is moved from the home position to the extended position.

20 Claims, 23 Drawing Sheets

(56) References Cited

U.S. PATENT DOCUMENTS

| | | | |
|---|---|---|---|
| 10,231,714 B2 | 3/2019 | Gao | |
| 10,335,128 B2 | 7/2019 | Heske | |
| 2005/0165328 A1 | 7/2005 | Heske et al. | |
| 2011/0208090 A1 | 8/2011 | Parihar | |
| 2015/0088031 A1* | 3/2015 | Paronetto | A61B 10/0233 600/567 |
| 2015/0150542 A1* | 6/2015 | Robertson | A61B 10/0233 74/89.39 |
| 2016/0089121 A1* | 3/2016 | Stand, III | A61B 10/0266 74/89.23 |
| 2019/0231325 A1* | 8/2019 | Nock | A61B 10/0275 |
| 2019/0365361 A1* | 12/2019 | Van Liere | A61B 10/0275 |
| 2020/0138418 A1* | 5/2020 | Stand, III | A61B 10/0275 |

FOREIGN PATENT DOCUMENTS

| | | | |
|---|---|---|---|
| JP | 2016067932 A | 5/2016 | |
| WO | 2018098239 A1 | 5/2018 | |

OTHER PUBLICATIONS

JP Notice of Allowance dated Aug. 9, 2024 pertaining to JP application 2022-529549 filed Jul. 13, 2022.

\* cited by examiner

BIOPSY APPARATUS HAVING A PIERCING MODULE

CROSS-REFERENCE TO RELATED APPLICATION

This application is a U.S. National Phase of PCT/US2020/061295, entitled "BIOPSY APPARATUS HAVING A PIERCING MODULE" and filed Nov. 19, 2020, which claims priority to U.S. provisional patent application Ser. No. 62/939,342 entitled "PIERCING MODULE/FIRING MECHANISM FOR MULTIPLE SAMPLE BIOPSY APPARATUS" filed Nov. 22, 2019, each of which are incorporated herein by reference.

TECHNICAL FIELD

The present invention relates to a biopsy apparatus, and, more particularly, to a biopsy apparatus having a piercing module, which is sometimes referred to in the art as a firing mechanism.

BACKGROUND ART

A biopsy may be performed on a patient to help in determining whether the tissue in a region of interest includes cancerous cells. One biopsy technique used to evaluate breast tissue, for example, involves inserting a biopsy probe into the breast tissue region of interest to capture one or more tissue samples from the region. Such a biopsy technique often utilizes a vacuum to pull the tissue to be sampled into a sample notch of the biopsy probe, after which the tissue is severed and collected. Efforts continue in the art to improve the ability of the biopsy device to be inserted into the tissue of the patient to be biopsied, sever a tissue sample, and to transport the severed tissue sample to a sample collection container. Such tissue may be, for example, dense and/or fibrous tissue.

What is needed in the art is a biopsy apparatus having a piercing module that has the ability to promote effective insertion of the needle portion (e.g., stylet and cutter cannula) of a biopsy probe assembly into the tissue of the patient.

SUMMARY OF INVENTION

The present invention provides a biopsy apparatus having a piercing module that has the ability to promote effective insertion of the needle portion (e.g., stylet and cutter cannula) of a biopsy probe assembly into the tissue of the patient.

The invention, in one form, is directed to a biopsy apparatus that includes a biopsy probe assembly and a piercing module. The biopsy probe assembly has a probe carrier body, a stylet cannula, and a cutter cannula that is coaxial with the stylet cannula. Each of the stylet cannula and the cutter cannula is coupled to the probe carrier body. The piercing module is drivably coupled to the probe carrier body. The piercing module includes a piercing module frame having a proximal portion and a distal portion. A probe drive slider is slidably coupled to the piercing module frame. The probe drive slider is drivably coupled to the probe carrier body of the biopsy probe assembly. The probe drive slider has a primed position and a fired position. A nut housing is movably coupled to the piercing module frame. The nut housing has a cocking position, a home position, and an extended position. A motor assembly has a motor and a motor housing. The motor housing is configured to mount the motor to the piercing module frame. The motor has a rotatable driveshaft. A drive spindle is drivably coupled to the rotatable driveshaft of the motor. The drive spindle is rotatably and drivably coupled to the nut housing. A firing spring is interposed between the motor housing and the probe drive slider. The firing spring is configured to bias the probe drive slider toward the fired position. A release arm has a mounting end portion and a head. The mounting end portion is pivotably coupled to the piercing module frame. The release arm has a latch position, wherein when the probe drive slider is in the primed position and the release arm is in the latch position, the head of the release arm is positioned to engage the probe drive slider to hold the probe drive slider in the primed position. A release slider is slidably coupled to the piercing module frame. The release slider is configured for engagement with the nut housing. The release slider is configured to release the release arm from the latch position when the nut housing is moved from the home position to the extended position by a rotation of the drive spindle.

The invention, in another form, is directed to a biopsy apparatus that has a biopsy probe assembly and a piercing module. The biopsy probe assembly has a probe carrier body, a stylet cannula, and a cutter cannula coaxial with the stylet cannula. Each of the stylet cannula and the cutter cannula is movably coupled to the probe carrier body. A piercing module is drivably coupled to the probe carrier body. The piercing module includes a piercing module frame that has a proximal portion and a distal portion. A probe drive slider is slidably coupled to the piercing module frame. The probe drive slider is configured for drivable coupling to the probe carrier body of the biopsy probe assembly. The probe drive slider is longitudinally translatable along the piercing module frame. The probe drive slider has a primed position and a fired position. A nut housing is movably coupled to the piercing module frame. The nut housing contains internal threads. The nut housing is longitudinally translatable along the piercing module frame. The nut housing has a cocking position, a home position, and an extended position. A motor assembly has a motor and a motor housing. The motor housing is configured to mount the motor to the proximal portion of the piercing module frame. The motor has a rotatable driveshaft. A drive spindle has a proximal end, a distal end, and an elongate threaded portion. The proximal end is drivably coupled to the rotatable driveshaft of the motor. The elongate threaded portion is rotatably engaged with the internal threads of the nut housing. The firing spring is interposed between the motor housing and the probe drive slider. The firing spring is configured to bias the probe drive slider toward the fired position. A release arm has a distal mounting end portion and a proximal head. The proximal head is longitudinally spaced from the distal mounting end portion. The distal mounting end portion is pivotably coupled to the distal portion of the piercing module frame. The release arm is biased by a first biasing spring toward a latch position, wherein when the probe drive slider is in the primed position and the release arm is in the latch position, the proximal head of the release arm is positioned to engage the probe drive slider to hold the probe drive slider in the primed position. A release slider is slidably coupled to the piercing module frame and is biased by a second biasing spring in a proximal direction. The release slider has an engagement portion configured for engagement with the nut housing. The release slider is configured to release the release arm from the latch position when the nut housing is moved from the home position to the extended position by rotation of the drive spindle.

The invention, in another form, is directed to a biopsy driver for drivable coupling to a biopsy probe assembly having a probe carrier body that carries a stylet cannula. The biopsy driver includes a piercing module frame having a proximal portion and a distal portion. A probe drive slider is slidably coupled to the piercing module frame. The probe drive slider is configured for drivable coupling to the probe carrier body of the biopsy probe assembly. The probe drive slider has a primed position and a fired position. A nut housing is movably coupled to the piercing module frame. The nut housing has a cocking position, a home position, and an extended position. A motor assembly has a motor and a motor housing. The motor housing is configured to mount the motor to the piercing module frame. The motor has a rotatable driveshaft. A drive spindle is drivably coupled to the rotatable driveshaft of the motor. The drive spindle is rotatably coupled to the nut housing. A firing spring is interposed between the motor housing and the probe drive slider. The firing spring is configured to bias the probe drive slider toward the fired position. A release arm has a mounting end portion and a head. The mounting end portion is pivotably coupled to the distal portion of the piercing module frame. The release arm is biased by a biasing member toward a latch position, wherein when the probe drive slider is in the primed position and the release arm is in the latch position, the head of the release arm is configured to engage the probe drive slider to hold the probe drive slider in the primed position. A release slider is slidably coupled to the piercing module frame. The release slider has an engagement portion configured for engagement with the nut housing. The release slider is configured to release the release arm from the latch position when the nut housing is moved from the home position to the extended position by rotation of the drive spindle by the motor.

BRIEF DESCRIPTION OF DRAWINGS

Features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate at least one embodiment of the invention, and such exemplifications are not to be construed as limiting the scope of the invention in any manner.

DESCRIPTION OF EMBODIMENTS

Figure 1:
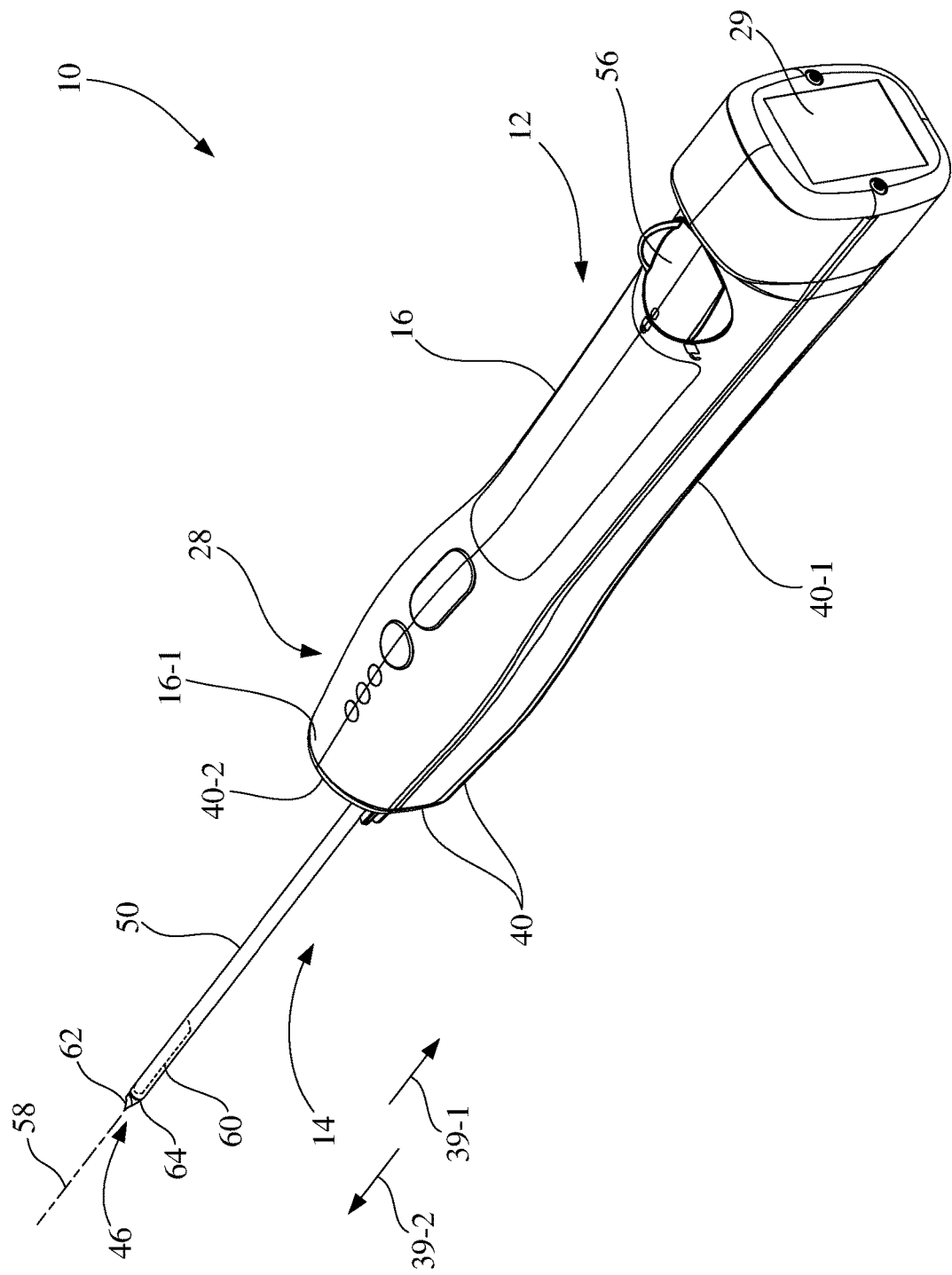
FIG. 1 is a perspective view of a biopsy apparatus configured in accordance with an embodiment of the present invention, with a biopsy probe assembly attached to a biopsy driver.
Figure 2:
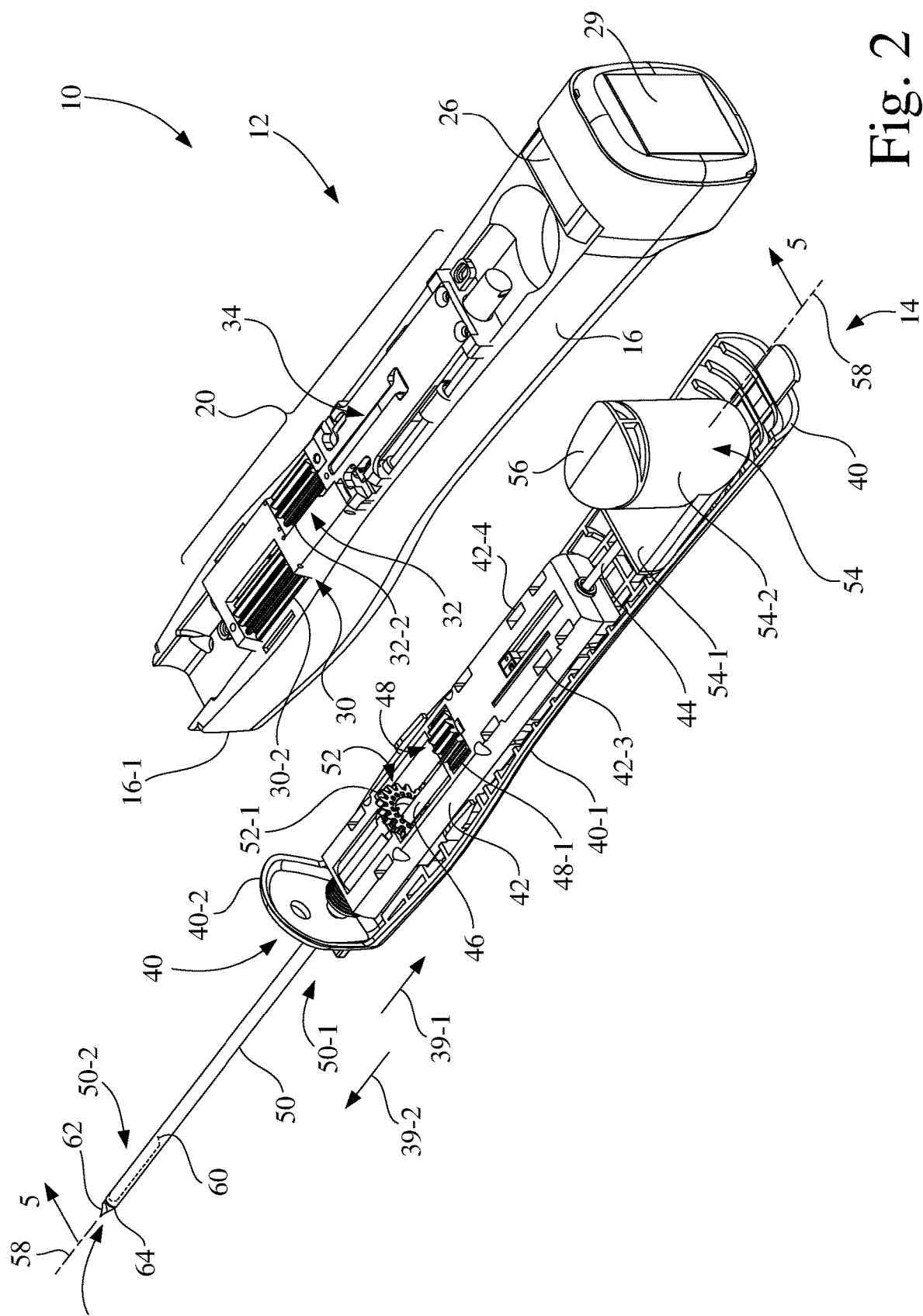
FIG. 2 is a perspective view of the biopsy apparatus of FIG. 1, with the biopsy probe assembly detached from the biopsy driver and with an upper cover of the biopsy driver removed to expose the piercing module of the biopsy driver.

Referring now to the drawings, and more particularly to FIGS. 1 and 2, there is shown a biopsy apparatus 10 that includes a non-invasive, e.g., non-disposable, biopsy driver 12 and an invasive, e.g., disposable, biopsy probe assembly 14. As used herein, the term "non-disposable" is used to refer to a device that is intended for use on multiple patients during the lifetime of the device, and the term "disposable"

is used to refer to a device that is intended to be disposed of after use on a single patient. Biopsy driver 12 includes a driver housing 16 that is configured and ergonomically designed to be grasped by a user.

Figure 3:
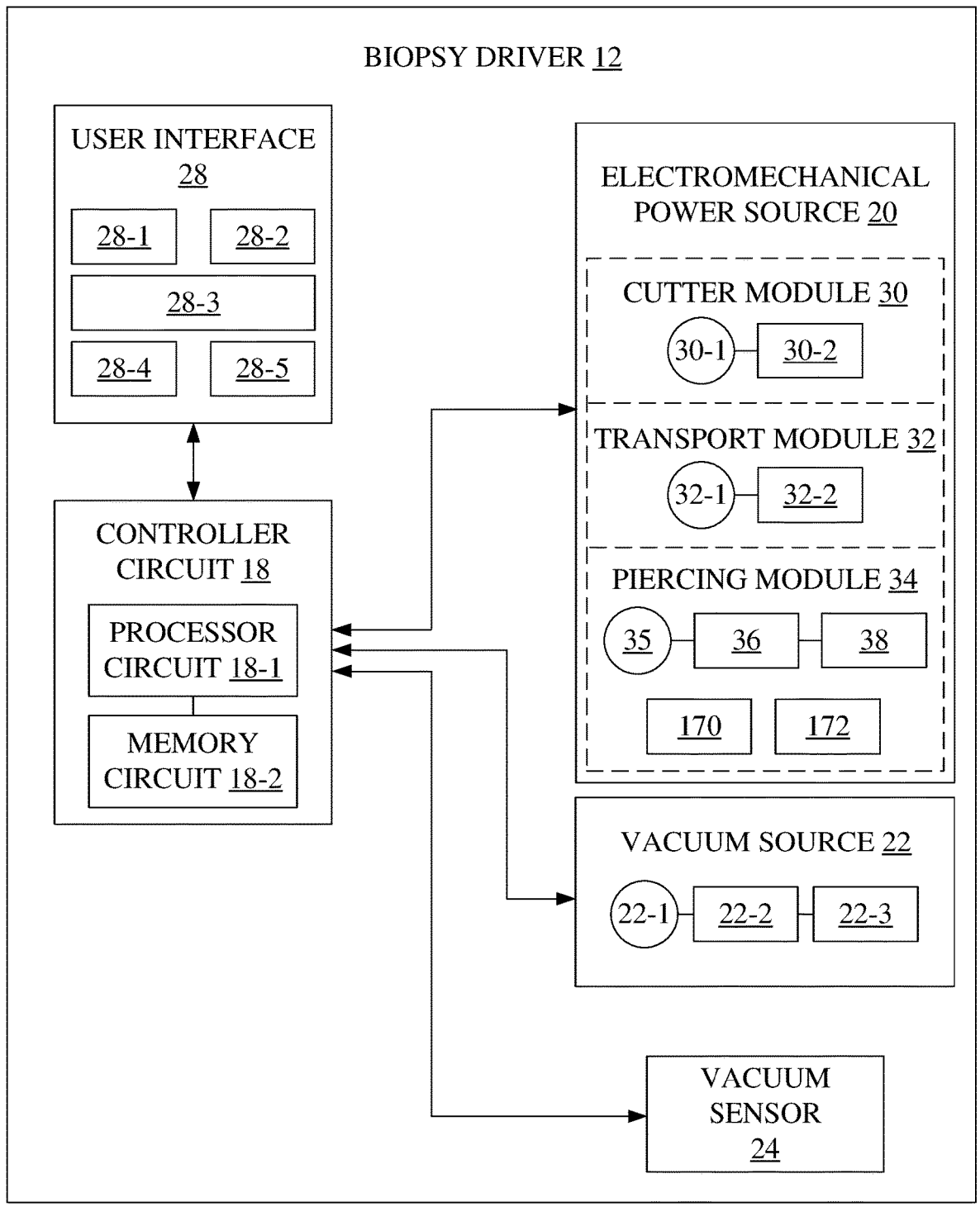
FIG. 3 is a block representation of the biopsy driver of FIG. 1.

Referring to FIGS. 2 and 3, biopsy driver 12 includes within driver housing 16 a controller circuit 18, an electromechanical power source 20, a vacuum source 22, a vacuum sensor 24, and a battery 26 (or alternatively an AC adapter). A user interface 28 (see FIG. 1), such as a keypad, is located to be mounted to driver housing 16, and externally accessible by the user with respect to driver housing 16. Battery 26 may be, for example, a rechargeable battery, which may be charged by an inductive charging device coupled to inductive coil 29, or alternatively, by an electrical connection to an electrical power supply. Battery 26 is electrically coupled to controller circuit 18, electromechanical power source 20, vacuum source 22, and user interface 28.

Referring to FIG. 3, user interface 28 may include control buttons and visual/aural indicators, with the control buttons providing user control over various functions of biopsy apparatus 10, and with the visual/aural indicators providing visual/aural feedback of the status of one or more conditions and/or positions of components of biopsy apparatus 10. The control buttons may include a sample button 28-1 and a prime/pierce button 28-2. The visual indicators may include a display screen 28-3 and/or one or more light emitting diodes (LED) 28-4. The aural indicator may include a buzzer 28-5. The control buttons may include tactile feedback to the user when activated.

Controller circuit 18 is electrically and communicatively coupled to electromechanical power source 20, vacuum source 22, vacuum sensor 24, and user interface 28, such as by one or more wires or circuit traces. Controller circuit 18 may be assembled on an electrical circuit board, and includes, for example, a processor circuit 18-1 and a memory circuit 18-2.

Processor circuit 18-1 has one or more programmable microprocessors and associated circuitry, such as an input/output interface, clock, buffers, memory, etc. Memory circuit 18-2 is communicatively coupled to processor circuit 18-1, e.g., via a bus circuit, and is a non-transitory electronic memory that may include volatile memory circuits, such as random access memory (RAM), and non-volatile memory circuits, such as read only memory (ROM), electronically erasable programmable ROM (EEPROM), NOR flash memory, NAND flash memory, etc. Controller circuit 18 may be formed as one or more Application Specific Integrated Circuits (ASIC).

Controller circuit 18 is configured via software and/or firmware residing in memory circuit 18-2 to execute program instructions to perform functions associated with the retrieval of biopsy tissue samples, such as that of controlling and/or monitoring one or more components of electromechanical power source 20, vacuum source 22, and vacuum sensor 24.

Electromechanical power source 20 of biopsy driver 12 may include, for example, a cutter module 30, a transport module 32, and a piercing module 34 (see also FIG. 2), each being respectively electrically coupled to battery 26. Each of cutter module 30, transport module 32, and piercing module 34 is electrically and controllably coupled to controller circuit 18 by one or more electrical conductors, e.g., wires or circuit traces. Piercing module 34 may be sometimes also be referred to in the art as a "firing mechanism".

Cutter module 30 may include an electrical motor 30-1 having a shaft to which a drive gear 30-2 is attached. Transport module 32 may include an electrical motor 32-1 having a shaft to which a drive gear 32-2 is attached. Piercing module 34 may include a motor 35 (e.g., an electrical motor), a drive spindle 36, and a probe drive slider 38. Each electrical motor 30-1, 32-1, 35 may be, for example, a direct current (DC) motor or stepper motor.

Referring to FIGS. 2 and 3, piercing module 34 of biopsy driver 12 is configured such that an activation of prime/pierce button 28-2 of user interface 28 a first time activates motor 35 to rotate drive spindle 36 so as to cause probe drive slider 38 to move in a proximal direction 39-1 to compress a firing spring, e.g., one or more coil springs, and to latch probe drive slider 38 in a ready position. Upon actuation of prime/pierce button 28-2 of user interface 28 a second time, probe drive slider 38 is propelled, i.e., fired, in a distal direction 39-2. Piercing module 34 will be described in more detail below.

Vacuum source 22 is electrically and controllably coupled to battery 26 by one or more electrical conductors, e.g., wires or circuit traces. Vacuum source 22 may include, for example, an electric motor 22-1 that drives a vacuum pump 22-2. Vacuum source 22 has a vacuum source port 22-3 coupled to vacuum pump 22-2 for establishing vacuum in biopsy probe assembly 14. Electric motor 22-1 may be, for example, a rotary, linear or vibratory DC motor. Vacuum pump 22-2 may be, for example, a peristaltic pump or a diaphragm pump, or one or more of each connected in series or parallel.

Vacuum sensor 24 is electrically coupled to controller circuit 18 by one or more electrical conductors, e.g., wires or circuit traces. Vacuum sensor 24 may be a pressure differential sensor that provides vacuum (negative pressure) feedback signals to controller circuit 18. In some implementations, vacuum sensor 24 may be incorporated into vacuum source 22.

Referring to FIGS. 1 and 2, biopsy probe assembly 14 is configured for releasable attachment to biopsy driver 12. As used herein, the term "releasable attachment" means a configuration that facilitates an intended temporary connection followed by selective detachment involving a manipulation of disposable biopsy probe assembly 14 relative to biopsy driver 12, without the need for tools.

Figure 4:
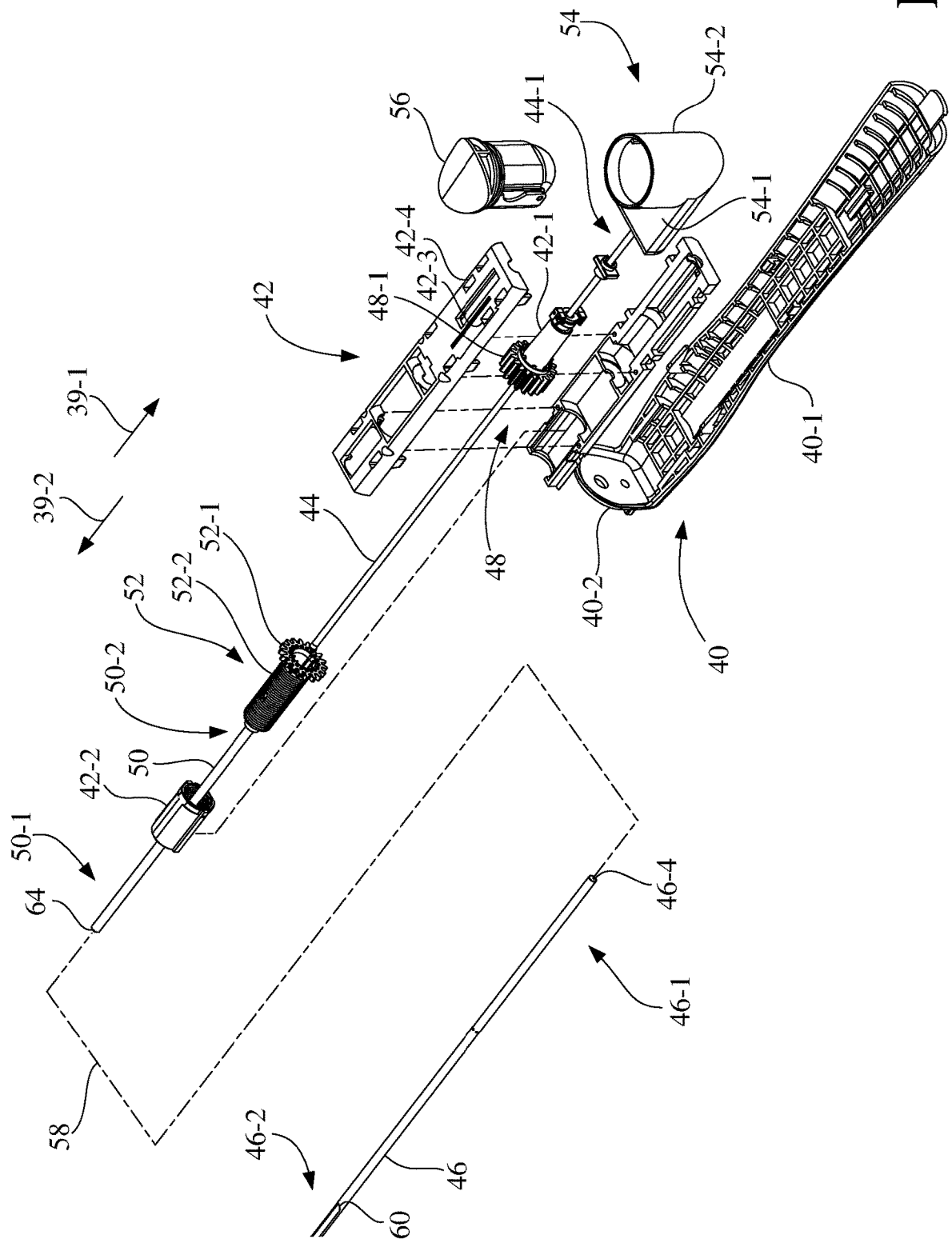
FIG. 4 is an exploded view of the biopsy probe assembly of FIG. 1.

Referring to the exploded view of FIG. 4, biopsy probe assembly 14 includes a probe housing 40, a probe carrier body 42, a vacuum cannula 44, a stylet cannula 46, a stylet gear-spindle set 48 for linear stylet translation, a cutter cannula 50, a cutter gear-spindle set 52 for rotary and linear cutter translation, a sample manifold 54, and a sample cup 56. Each of stylet cannula 46 and cutter cannula 50 is coupled, e.g., movably coupled, to probe carrier body 42.

Referring to FIGS. 2 and 4, probe housing 40 is formed as an L-shaped structure having an elongate portion 40-1 and a front plate 40-2. When biopsy probe assembly 14 is attached to biopsy driver 12, front plate 40-2 is positioned distally adjacent to an entirety of front surface 16-1 of driver housing 16, i.e., so as to shield the entirety of front surface 16-1 of the non-disposable biopsy driver from contact with a patient.

Vacuum cannula 44, stylet cannula 46, and cutter cannula 50 are coaxially arranged along a longitudinal axis 58 in a nested tube arrangement, with vacuum cannula 44 being the innermost tube, cutter cannula 50 being the outermost tube, and stylet cannula 46 being the intermediate tube that is interposed between vacuum cannula 44 and cutter cannula 50. In other words, vacuum cannula 44 is positioned inside stylet cannula 46, and stylet cannula 46 is positioned inside cutter cannula 50.

Vacuum cannula 44 is mounted to be stationary relative to probe carrier body 42. Vacuum cannula 44 is coupled in fluid communication with vacuum source 22 via sample manifold 54.

Figure 5:
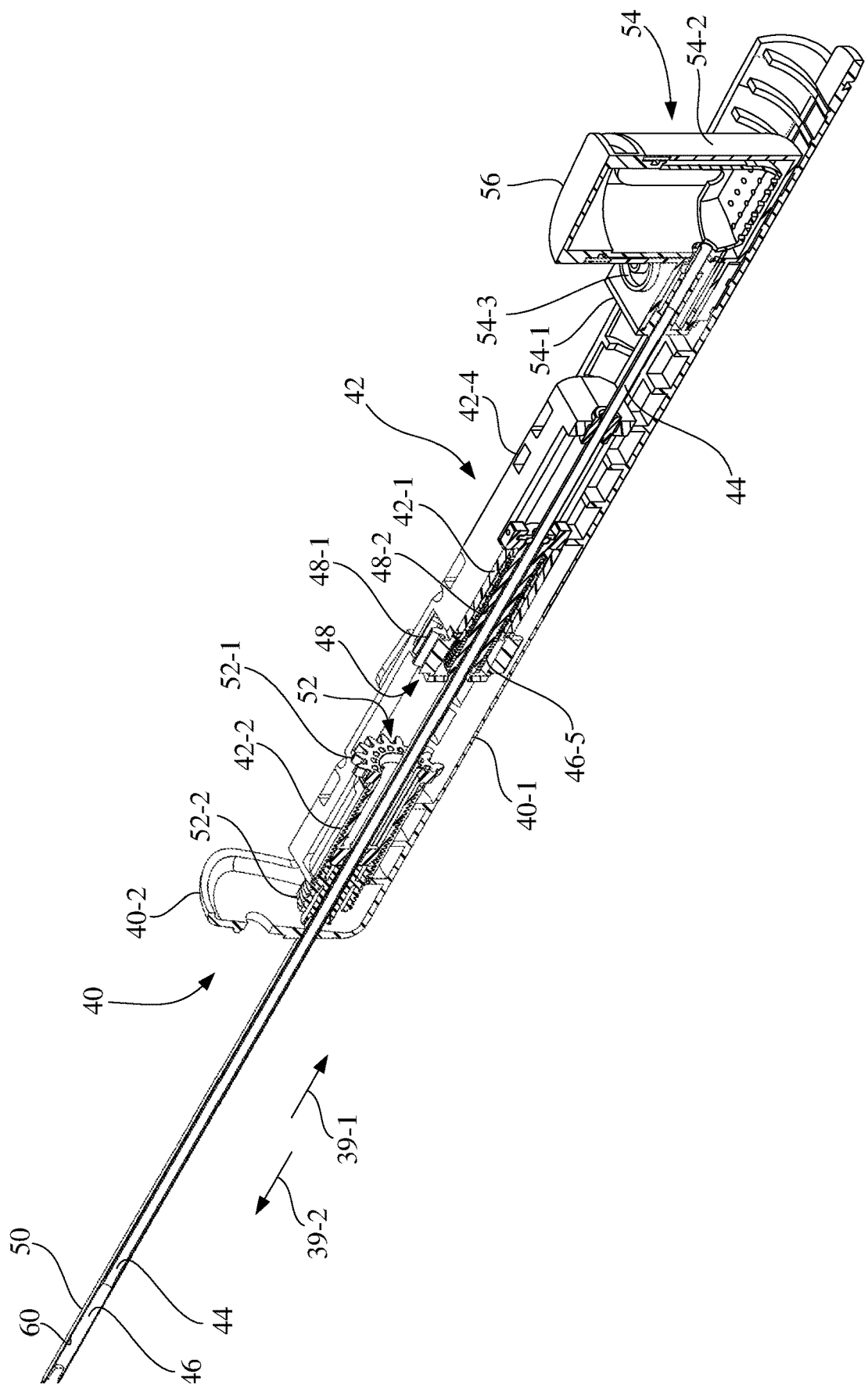
FIG. 5 is a section view of the biopsy probe assembly of FIGS. 1 and 2, taken along line 5-5 of FIG. 2.
Figure 6:
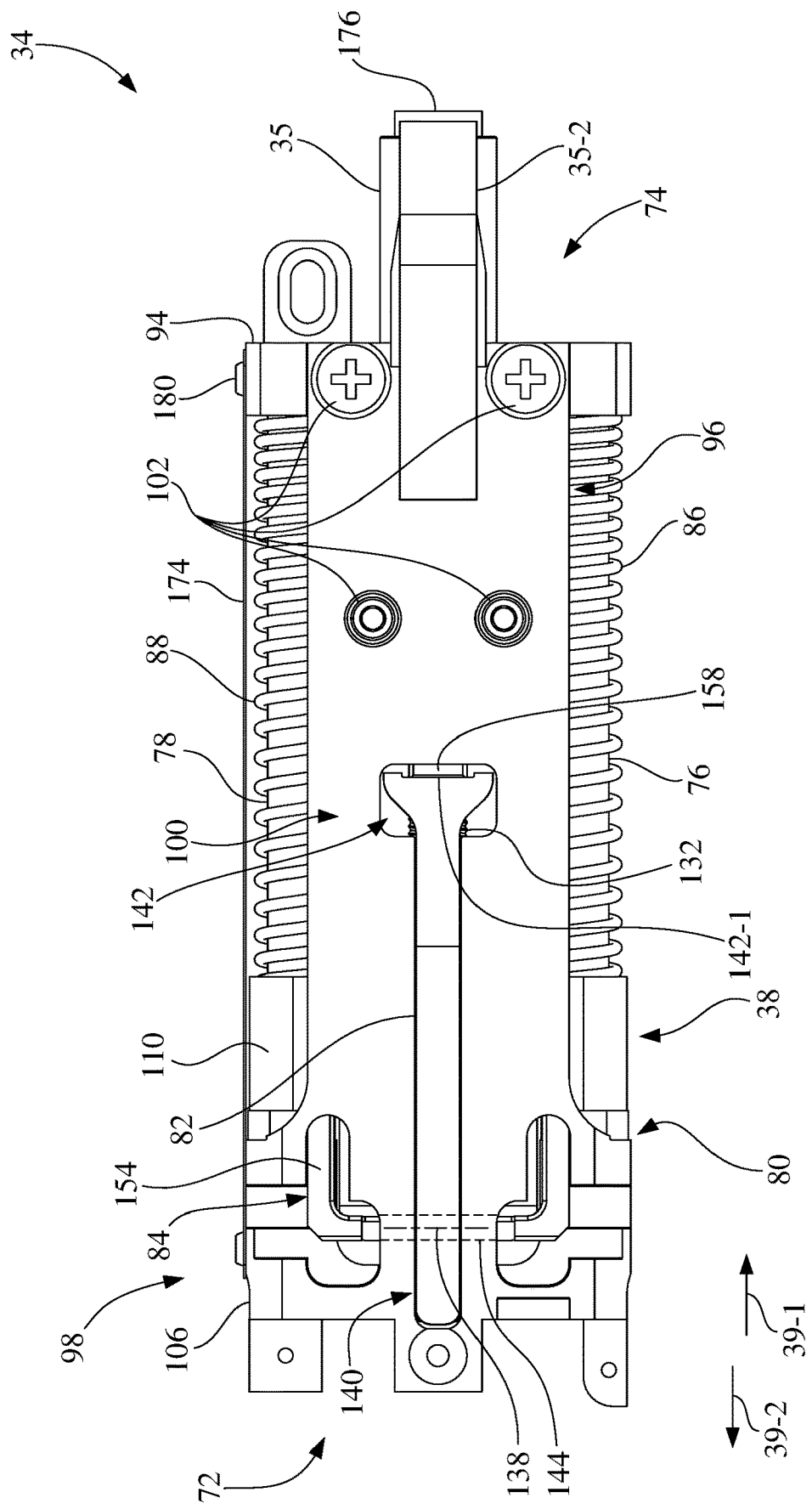
FIG. 6 is a top view of the piercing module of FIG. 2.
Figure 7:
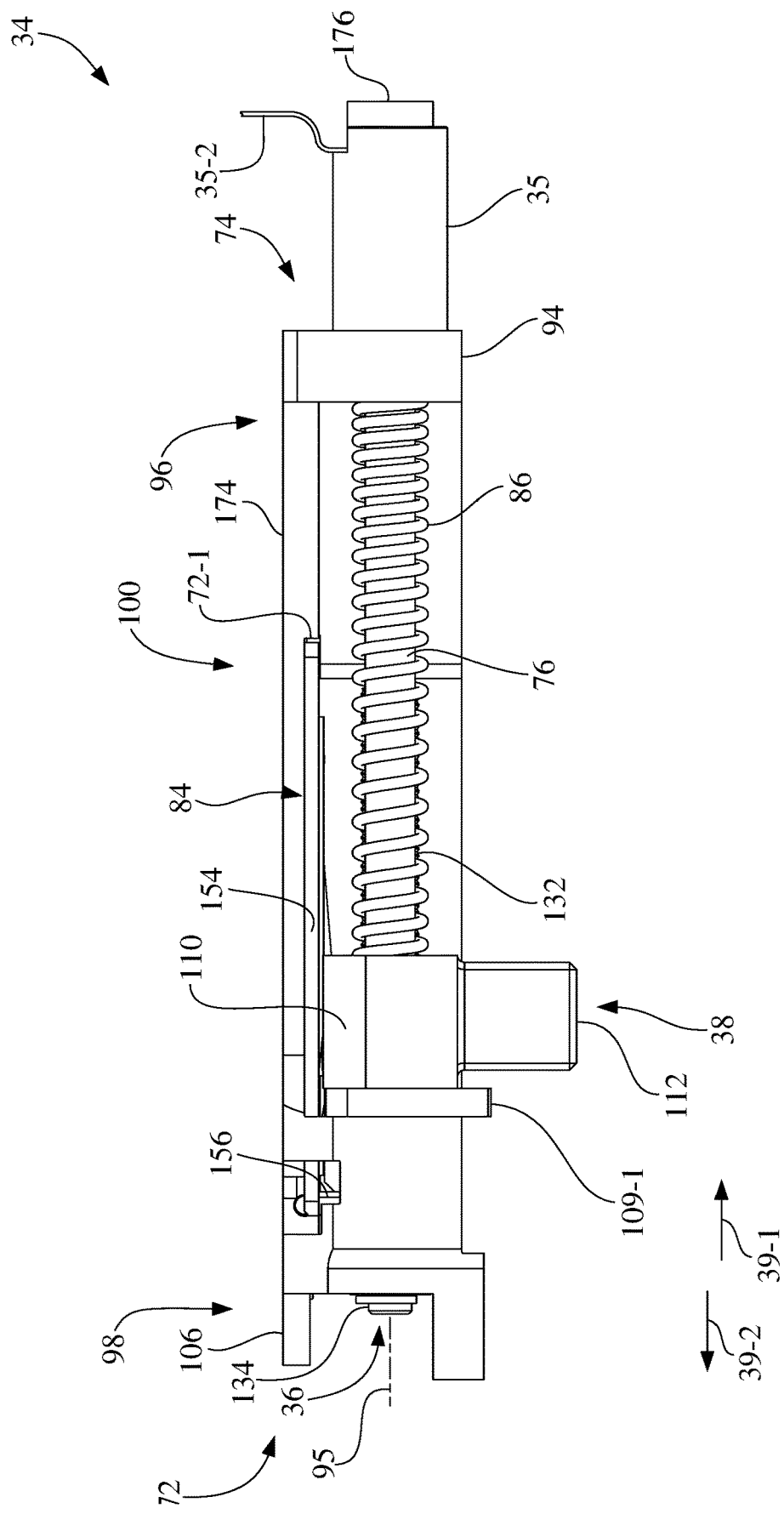
FIG. 7 is a side view of the piercing module of FIG. 2.
Figure 8:
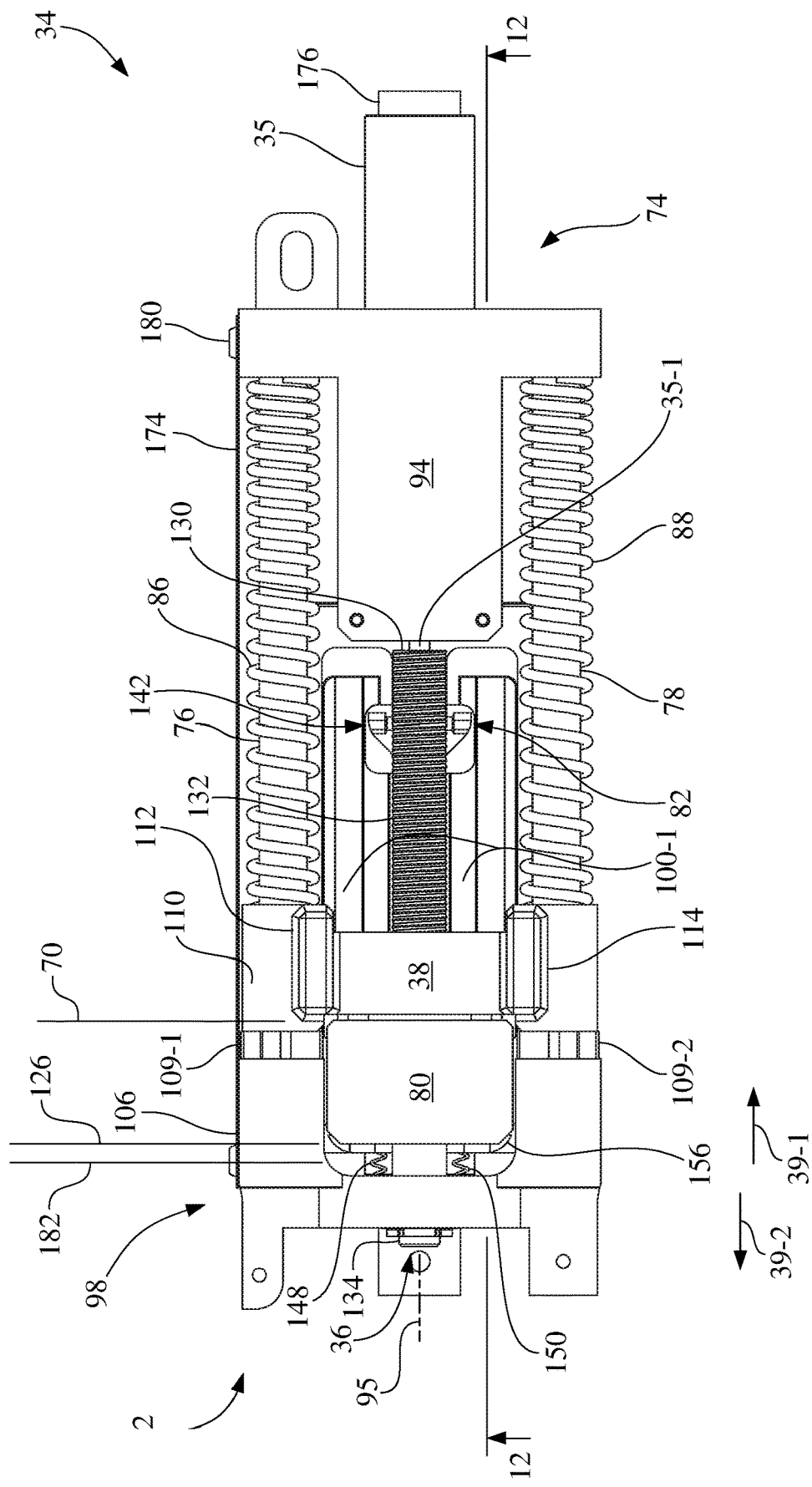
FIG. 8 is a bottom view of the piercing module of FIG. 2, opposite to the top view of FIG. 6, and showing the probe drive slider in a fired position and the nut housing in a home position.
Figure 9:
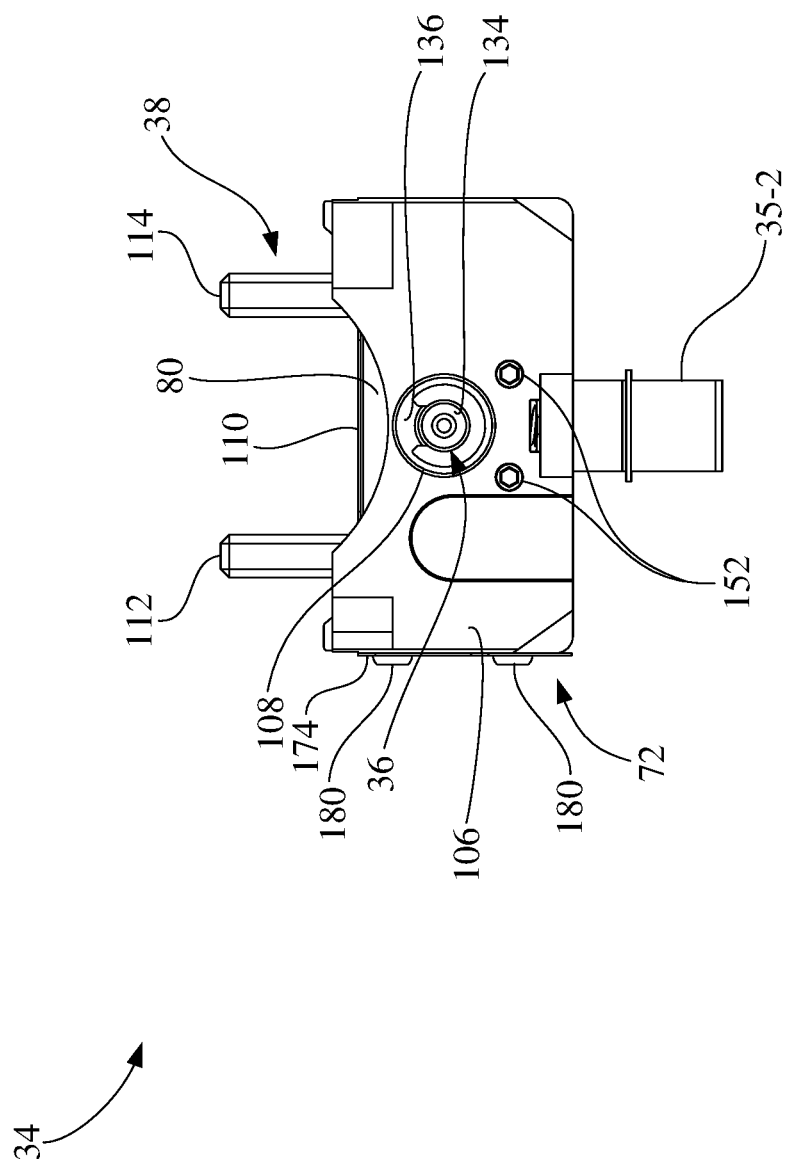
FIG. 9 is a distal end view of the piercing module in the orientation depicted in FIG. 8.
Figure 10:
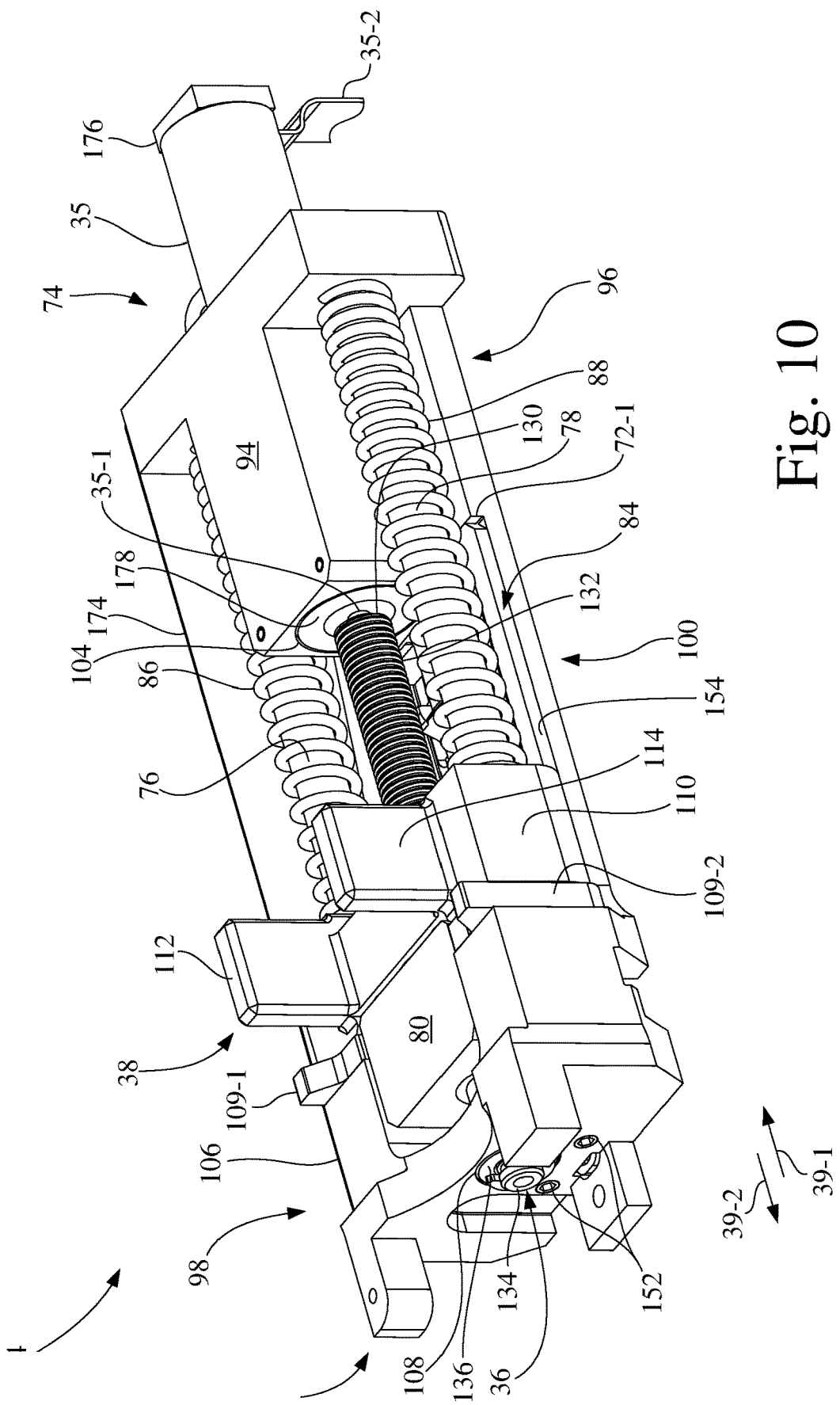
FIG. 10 is a perspective view of the piercing module of FIGS. 2 and 6-9, inverted from the orientation of the piercing module of FIG. 2, and showing the probe drive slider in the fired position and the nut housing in the home position, as also shown in FIG. 8.

Referring to FIGS. 4 and 5, stylet cannula 46 includes a proximal portion 46-1 and a distal portion 46-2. Distal portion 46-2 includes a sample notch 60. Attached to distal portion 46-2 is a piercing tip 62, which in turn forms part of stylet cannula 46. Stylet gear-spindle set 48 threadably engages external threads of a transport spindle 46-5 that is fixedly attached (e.g., glued, welded or staked) to proximal portion 46-1 of stylet cannula 46. Stylet gear-spindle set 48 is a unitary gear having a driven gear 48-1 fixedly attached to a threaded spindle 48-2, and may be formed as a single molded component. Stylet cannula 46 is retracted or extended along longitudinal axis 58 by activation of transport module 32 of biopsy probe assembly 14, with drive gear 32-2 of transport module 32 of biopsy driver 12 being engaged with driven gear 48-1 of stylet gear-spindle set 48.

Sample notch 60 is formed as an elongate opening in a side wall of stylet cannula 46 to facilitate a reception of tissue into a lumen 46-4 of stylet cannula 46. Sample notch 60 has a longitudinal extent that extends along longitudinal axis longitudinal axis 58. Sample notch 60 does not extend in the side wall below a centerline of the diameter of stylet cannula 46, and may include cutting edges around the perimeter of the opening formed by sample notch 60, wherein the cutting edges of the elongate (linear) portions of sample notch 60 each have a cutting edge that diverges from a cutting edge along the side wall to the centerline at a diameter of stylet cannula 46.

Referring again to FIG. 4, cutter cannula 50 includes a proximal portion 50-1 and a distal portion 50-2. Distal portion 50-2 includes an annular cutting edge 64. Cutter gear-spindle set 52 is fixedly attached (e.g., glued, welded or staked) to proximal portion 50-1 of cutter cannula 50. Cutter gear-spindle set 52 is a unitary gear having a driven gear 52-1 fixedly attached to a threaded spindle 52-2, and may be formed as a single molded component. Cutter cannula 50 is retracted or extended along longitudinal axis 58 by activation of cutter module 30 of biopsy probe assembly 14, with drive gear 30-2 of cutter module 30 of biopsy driver 12 being engaged with driven gear 52-1 of cutter gear-spindle set 52. Thus, cutter cannula 50 has a rotational cutting motion and is translated axially along longitudinal axis 58. The pitch of the threads of threaded spindle 52-2 determines the number of revolutions per axial distance (in millimeters (mm)) that cutter cannula 50 moves axially.

Sample manifold 54 is configured as an L-shaped structure having a vacuum chamber portion 54-1 and a collection chamber portion 54-2. Vacuum chamber portion 54-1 includes a vacuum input port 54-3 that is arranged to sealably engage vacuum source port 22-3 of vacuum source 22 of biopsy driver 12 when biopsy probe assembly 14 is attached to biopsy driver 12. Vacuum chamber portion 54-1 is connected in fluid communication with collection chamber portion 54-2. The proximal end of elongate portion 44-1 of vacuum cannula 44 passes through vacuum chamber portion 54-1 and is in direct fluid communication with collection chamber portion 54-2. Collection chamber portion 54-2 has a cavity sized and arranged to removably receive sample cup 56, such that sample cup 56 is in direct fluid communication with elongate portion 44-1 of vacuum cannula 44, and sample cup 56 also is in direct fluid communication with vacuum input port 54-3 of vacuum chamber portion 54-1. Blotting papers are placed in vacuum chamber portion 54-1 in a region between vacuum input port 54-3 and collection chamber portion 54-2.

Accordingly, a tissue sample severed by cutter cannula 50 at sample notch 60 of stylet cannula 46 may be transported by vacuum applied by vacuum source 22 at sample cup 56, through vacuum cannula 44, and into sample cup 56.

Referring again to FIGS. 2, 4 and 5, probe carrier body 42 is a carrier body that is slidably coupled to probe housing 40, e.g., using a rail/slot arrangement. Probe carrier body 42 carries a proximal threaded portion 42-1 and a distal threaded portion 42-2. Also, probe carrier body 42 is configured to be drivably coupled to piercing module 34. Stated differently, piercing module 34 is drivably coupled to probe carrier body 42 when biopsy driver 12 is coupled to biopsy probe assembly 14 to form biopsy apparatus 10.

Probe carrier body 42 includes one or more piercing module engagement opening, e.g., slot(s). In the present embodiment, with reference to FIG. 2, probe carrier body 42 includes a piercing module engagement opening 42-3 and a piercing module engagement opening 42-4, each of which is configured, e.g., in size and in shape, to receive a respective drive protrusion of piercing module 34, as will be described in more detail below. For example, each of piercing module engagement opening 42-3 and piercing module engagement opening 42-4 may be a respective rectangular slot. While the present embodiment includes two piercing module engagement openings for symmetry and/or redundancy, an alternative embodiment may have, for example, only one piercing module engagement opening, e.g., piercing module engagement opening 42-3.

Proximal threaded portion 42-1 in probe carrier body 42 has a threaded hole that threadably receives threaded spindle 48-2 of stylet gear-spindle set 48, such that rotation of driven gear 48-1 of stylet gear-spindle set 48 results in a linear translation of stylet cannula 46 along longitudinal axis 58, with a direction of rotation correlating to a direction of translation of stylet cannula 46 in one of proximal direction 39-1 and distal direction 39-2. Driven gear 48-1 of stylet gear-spindle set 48 engages drive gear 32-2 of transport module 32 when biopsy probe assembly 14 is attached to biopsy driver 12 (see FIG. 1).

Likewise, distal threaded portion 42-2 of probe carrier body 42 has a threaded hole that threadably receives threaded spindle 52-2 of cutter gear-spindle set 52, such that rotation of driven gear 52-1 of cutter gear-spindle set 52 results in a combined rotation and linear translation of cutter cannula 50 along longitudinal axis 58, with a direction of rotation correlating to a direction of translation of cutter cannula 50. Driven gear 52-1 of cutter gear-spindle set 52 engages drive gear 30-2 of cutter module 30 when biopsy probe assembly 14 is attached to biopsy driver 12 (see FIG. 1).

Also, when biopsy probe assembly 14 is attached to biopsy driver 12, referring also to FIGS. 2 and 3, probe carrier body 42 is drivably coupled to probe drive slider 38 of piercing module 34. As such, upon a first actuation of prime/pierce button 28-2, probe carrier body 42 and probe drive slider 38 are translated in unison in proximal direction 39-1 to position probe drive slider 38 and probe carrier body 42 carrying stylet cannula 46 and cutter cannula 50 in the ready, i.e., cocking position, and upon a second actuation of prime/pierce button 28-2 to effect a piercing shot, probe carrier body 42 and probe drive slider 38 are rapidly propelled in unison in distal direction 39-2 to position stylet cannula 46 and cutter cannula 50 at the distal most position of the combined elements, e.g., within the patient.

The structure of piercing module 34 will now be described with reference to FIGS. 6-22.

Figure 11:
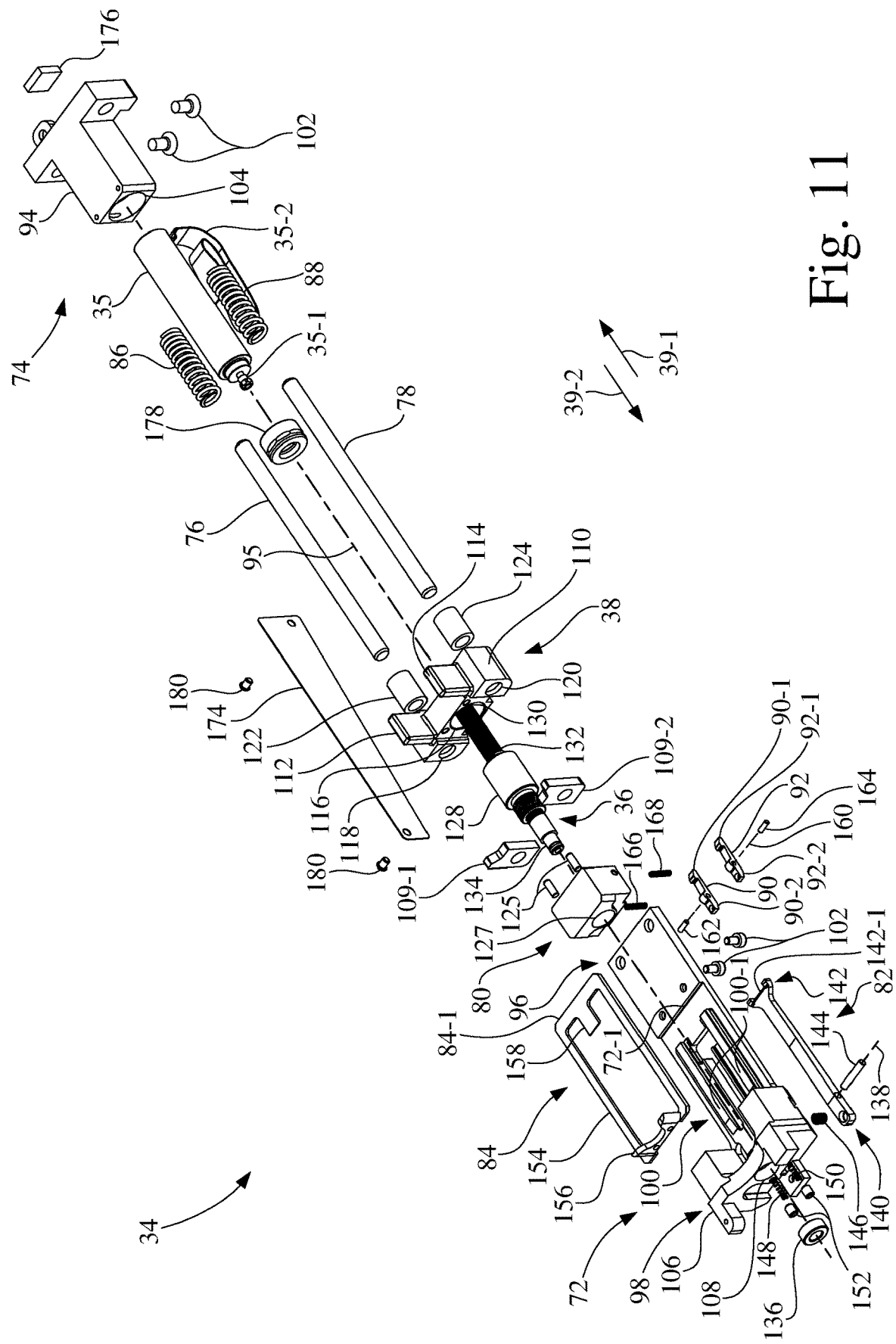
FIG. 11 is an exploded view of the piercing module of FIGS. 2 and 6-10.

In FIGS. 6-10 and 12, piercing module 34 is shown with probe drive slider 38 in a fired position 70. FIG. 11 is an exploded view showing the individual components of piercing module 34.

Referring particularly to FIG. 11, piercing module 34 includes a piercing module frame 72; a motor assembly 74; guide rods 76, 78; probe drive slider 38; a nut housing 80; a drive spindle 36; a release arm 82; a release slider 84, firing springs 86, 88; and pivot latches 90, 92. Motor assembly 74 includes a motor housing 94 that is configured, e.g., in size and in shape, to mount motor 35 to piercing module frame 72. A rotational driveshaft 35-1 of motor 35 and a longitudinal extent of drive spindle 36 are arranged on and along a longitudinal axis 95. Motor 35 includes a flex cable 35-2, e.g., a multi-conductor cable that supplies electrical power and/or control signals from controller circuit 18 to motor 35.

Piercing module frame 72 has a proximal portion 96, a distal portion 98, and an intermediate section 100. Intermediate section 100 longitudinally extends between proximal portion 96 and distal portion 98. Proximal portion 96 is configured as a flat plate having holes to facilitate the mounting of motor housing 94 to proximal portion 96 via screws 102.

Motor housing 94 extends perpendicular to intermediate section 100. Motor housing 94 includes a motor aperture 104 configured, e.g., in size and shape, to mount motor 35. Motor housing 94 may include threaded holes to facilitate connection to proximal portion 96 of piercing module frame 72 via screws 102, so as to mount motor 35 to proximal portion 96 of piercing module frame 72.

Piercing module frame 72 has a distal block 106 at distal portion 98. Distal block 106 extends perpendicular to intermediate section 100. Distal block 106 is longitudinally spaced from motor housing 94. Distal block 106 has a bearing mount 108, which may be configured as a bearing aperture. Bumpers 109-1, 109-2, e.g., made of rubber, may be attached to a proximal face of distal block 106 so as to provide an impact absorbing surface for engagement by probe drive slider 38.

Guide rods 76, 78 are located to extend in parallel from motor housing 94 to distal block 106. The opposed ends of each of guide rod 76 and guide rod 78 are respectively mounted to each of motor housing 94 and to distal block 106 of piercing module frame 72.

Figure 2A:
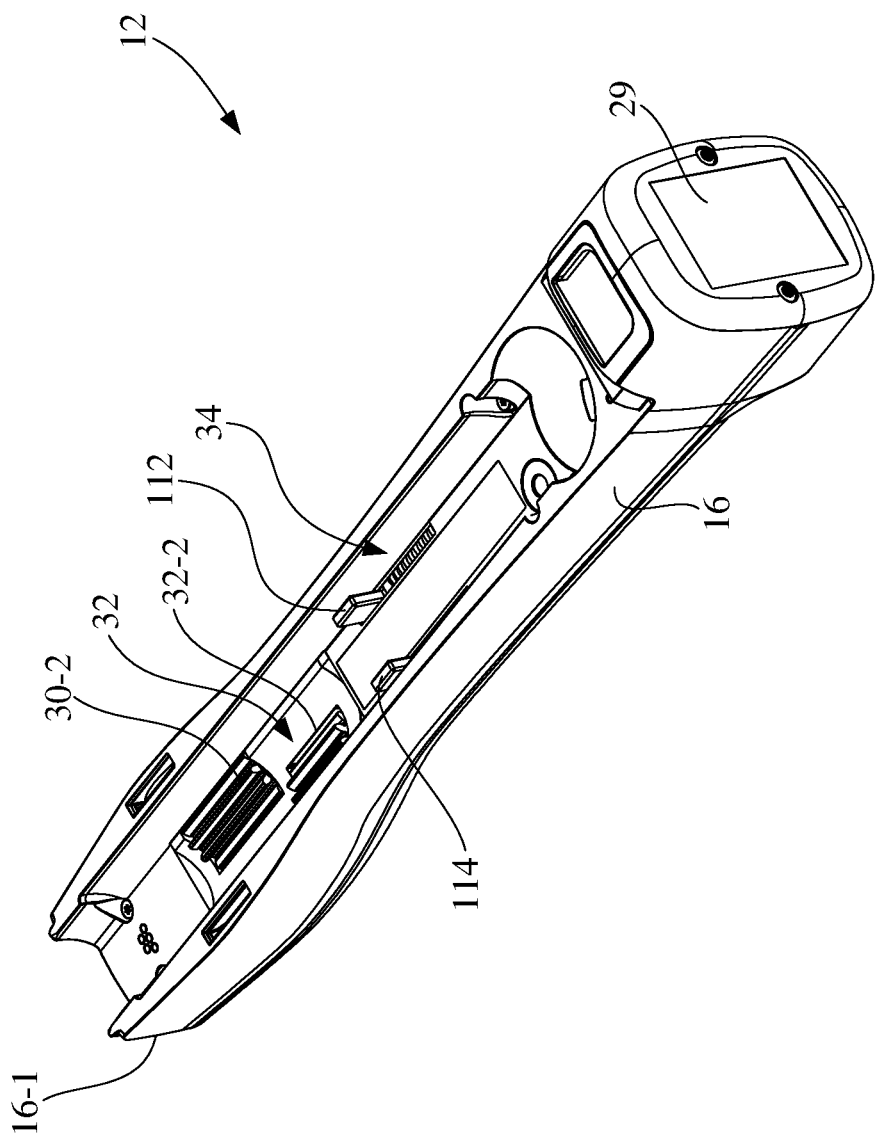
FIG. 2A is a bottom view of the biopsy driver of FIG. 2, with the biopsy driver inverted from the orientation shown in FIG. 2.

Probe drive slider 38 is slidably coupled to piercing module frame 72 via guide rods 76, 78. As such, probe drive slider 38 is longitudinally translatable along piercing module frame 72. As discussed above, probe drive slider 38 is drivably coupled to probe carrier body 42 of the biopsy probe assembly when biopsy driver 12 is coupled to biopsy probe assembly 14. Probe drive slider 38 includes a slider body 110 and probe engagement protrusions 112, 114 (see also FIG. 2A). Probe engagement protrusion 112, 114 extend perpendicular to slider body 110. Each of probe engagement protrusion 112 and probe engagement protrusion 114 is configured to be received in a respective piercing module engagement opening, e.g., piercing module engagement opening 42-3 and piercing module engagement opening 42-4, of probe carrier body 42 (see FIG. 2) to effect longitudinal movement of probe carrier body 42 in unison with longitudinal movement of probe drive slider 38.

In the present embodiment, slider body 110 includes a through-opening 116 through which drive spindle 36 may pass without engagement. Also, slider body 110 includes guide apertures 118, 120, e.g., a pair of guide apertures, for respectively receiving bearings 122, 124 in a press fit. Stated differently, guide apertures 118, 120 are configured to respectively receive guide rods 76, 78 in sliding engagement, wherein bearing 122 is radially interposed between guide rod 76 and guide aperture 118 of slider body 110 of probe drive slider 38, and bearing 124 is radially interposed between guide rod 78 and guide aperture 120 of slider body 110 of probe drive slider 38. Each of bearing 122 and bearing 124 may be, for example, cylindrical bushing having a respective bore configured, e.g., in size and in shape, to slidably receive guide rod 76 and guide rod 78. As such, probe drive slider 38 is slidably longitudinally translatable along guide rods 76, 78.

Dowel pins 125 may be used as alignment devices to provide a releasable alignment of probe drive slider 38 with nut housing 80 about longitudinal axis 95 when nut housing 80 is engaged with probe drive slider 38.

In FIGS. 8-10 and 12, nut housing 80 is shown in a home position 126. Home position 126 is also considered a "zero" position from which other positions may be determined, e.g., based on counting revolutions and/or partial revolutions of drive spindle 36 and/or motor driveshaft 35-1 and converting the revolutions to a linear distance, e.g., as performed by controller circuit 18. Nut housing 80 is movably coupled to piercing module frame 72 and is longitudinally translatable along piercing module frame 72. For example, nut housing 80 may slide along intermediate section 100 of piercing module frame 72. Nut housing 80 contains internal threads. In the present embodiment, nut housing 80 includes a nut aperture 127 that is configured, e.g., in size and in shape, to fixedly mount a nut 128, e.g., in a pressed or threaded fit, wherein the nut 128 has an aperture having the internal threads. In FIG. 11, nut 128 is shown with its internal threads threadably engaged with the external threads of drive spindle 36. Nut housing 80 longitudinally translates, e.g., slides, along intermediate section 100 of piercing module frame 72 by the rotation of drive spindle 36.

Drive spindle 36 is longitudinally stationary relative to piercing module frame 72, and drive spindle 36 will only rotate clockwise or counterclockwise depending on the commanded prime (cocking) operation or pierce (firing) operation. There is, of course, a small longitudinal slack from component tolerances.

Drive spindle 36 has a proximal end 130, an elongate threaded portion 132, and a distal end 134. Drive spindle 36 may be, for example, a screw spindle, e.g., a threaded ball screw spindle. Proximal end 130 of drive spindle 36 is drivably coupled, e.g., in a keyed arrangement, to a rotatable driveshaft 35-1 of motor 35. Elongate threaded portion 132 of drive spindle 36 is rotatably and drivably coupled to, e.g., engaged with, nut housing 80 via nut 128. Stated differently, elongate threaded portion 132 is rotatably engaged with the internal threads contained in nut housing 80. Distal end 134 of drive spindle 36 is rotatably coupled to distal block 106 of piercing module 34 frame via a bearing 136. For example, in the present embodiment, distal end 134 of drive spindle 36 is received in bearing mount 108 at distal portion 98 of piercing module frame 72, with bearing 136 being radially interposed between distal end 134 of drive spindle 36 and bearing mount 108 of distal block 106 of piercing module frame 72. Bearing 136 may be, for example, a ball bearing having an outer race received in a snug (e.g., press) fit in bearing mount 108 of distal block 106, and having an inner race received in a snug fit over distal end 134 of drive spindle 36.

Each of firing springs 86, 88 is interposed between motor housing 94 and probe drive slider 38. Each of firing spring 86 and firing spring 88 is configured, e.g., in size and in shape, to bias probe drive slider 38 in distal direction 39-2 toward fired position 70. Stated differently, each of firing spring 86 and firing spring 88 is configured, e.g., in size and in shape, to bias probe drive slider 38 in distal direction 39-2 toward distal block 106 of piercing module frame 72. In the present embodiment, each of firing springs 86, 88 is a coil spring, wherein firing spring 86 is received over guide rod 76 and firing spring 88 is received over guide rod 78, and the combined spring force generated by firing springs 86, 88 is approximately 70 Newtons.

While the present embodiment includes two firing springs 86, 88 for symmetry and/or redundancy, an alternative embodiment may have, for example, only one firing spring, e.g., firing spring 86.

Release arm 82 is pivotably coupled to piercing module frame 72 and is configured to pivot about a pivot axis 138. Release arm 82 has a mounting end portion 140 and a head 142. Mounting end portion 140 is pivotably coupled to piercing module frame 72 via a pin 144. Head 142 of release arm 82 is longitudinally spaced from mounting end portion 140 of release arm 82. An arm biasing member 146, e.g., a coil spring, is located between mounting end portion 140 of release arm 82 and piercing module 34 to apply a biasing force to mounting end portion 140 of release arm 82 so as to tend to rotate release arm 82 about pivot axis 138.

Release slider 84 is slidably coupled to piercing module frame 72 for longitudinal movement along ramp surfaces 100-1 of intermediate section 100 of piercing module frame 72. Release slider 84 is configured for engagement with nut housing 80. Release slider biasing members 148, 150, such as coil springs, are configured to bias release slider 84 slidably in a proximal direction 39-1. Release slider biasing members 148, 150 are inserted through corresponding apertures in distal block 106, which are in turn closed by screws 152. Release slider biasing members 148, 150 extend in proximal direction 39-1 from distal block 106.

While the present embodiment includes two release slider biasing members 148, 150 for symmetry and/or redundancy, an alternative embodiment may have, for example, only one release slider biasing member, e.g., release slider biasing member 148.

In the present embodiment, release slider 84 has an open planar frame 154, an engagement portion 156, and a cantilever release member 158. Engagement portion 156 extends perpendicularly from open planar frame 154 and is positioned between nut housing 80 and distal block 106. Engagement portion 156 is configured, e.g., in size and in shape, for engagement with nut housing 80 as nut housing 80 is moved in distal direction 39-2. Cantilever release member 158 extends inwardly, e.g., in distal direction 39-2, from open planar frame 154. Cantilever release member 158 is configured, e.g., in size and in shape, to engage head 142 of release arm 82.

Figure 12:
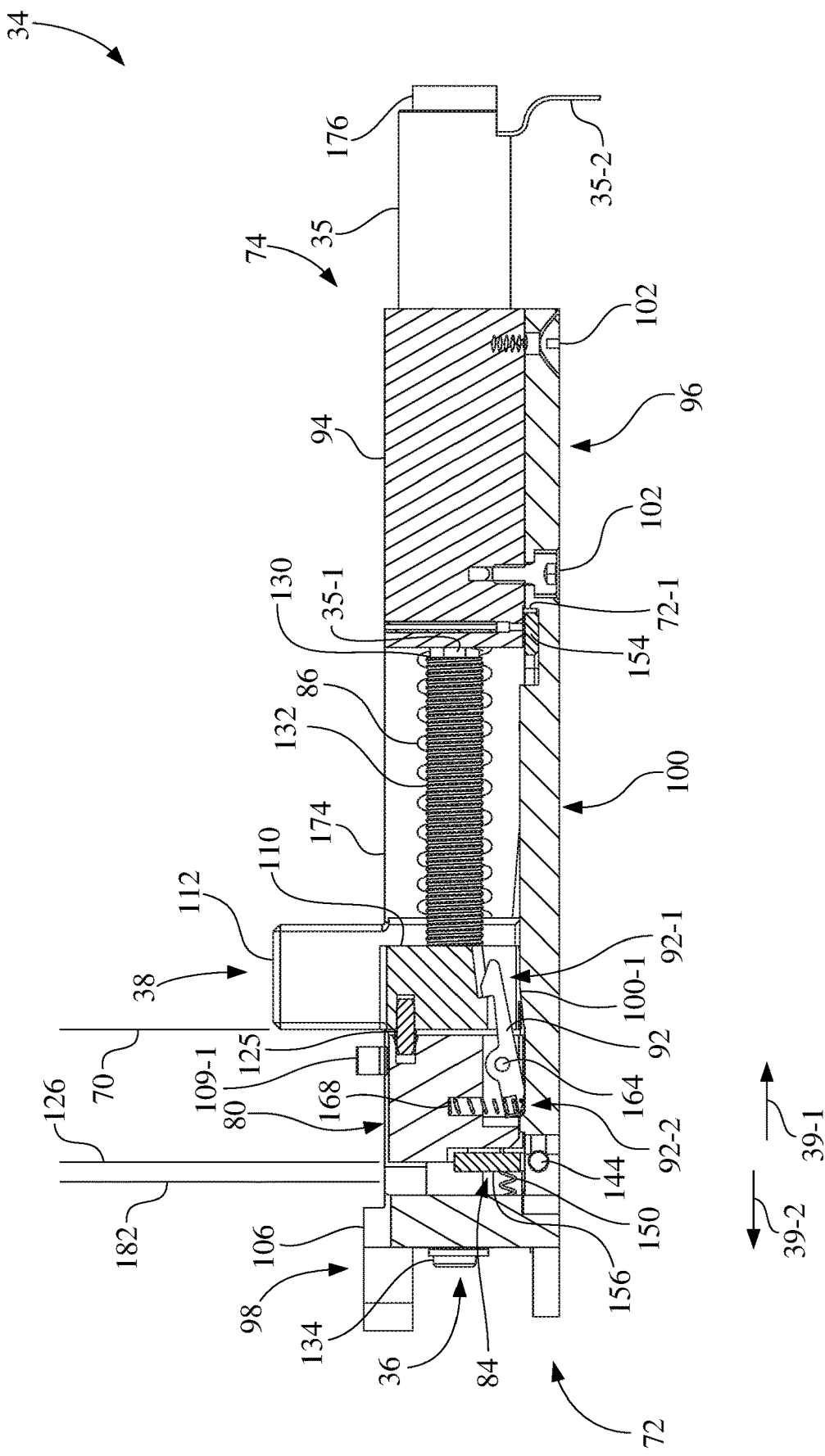
FIG. 12 is a section view of the piercing module taken along line 12-12 of FIG. 8, showing the probe drive slider in the fired position and the nut housing in the home position, and showing a pivot latch of the nut housing engaged with a slider body of the probe drive slider to lock the nut housing and the probe drive slider together.

Referring to FIG. 12, release slider biasing members 148, 150 extend in proximal direction 39-1 from distal block 106 to contact engagement portion 156 of release slider 84 so as to bias proximal end 84-1 of release slider 84 in proximal direction 39-1 into contact with a shoulder 72-1 of piercing module frame 72 located at the proximal extent of intermediate section 100 of piercing module frame 72. Stated differently, release slider biasing members 148, 150 are engaged with engagement portion 156 to bias release slider 84 in proximal direction 39-1, i.e., toward nut housing 80.

Referring to FIGS. 11 and 12, pivot latches 90, 92 are pivotably mounted to nut housing 80 to pivot about a pivot axis 160. Each of pivot latch 90 and pivot latch 92 is pivotably mounted to nut housing 80 by a pivot pin 162 and a pivot pin 164, respectively. Pivot latch 90 has a hook end 90-1 and a tail end 90-2. Pivot latch 92 has a hook end 92-1 and a tail end 92-2. A biasing spring 166, e.g., a coil spring, is interposed between nut housing 80 and tail end 90-2 of pivot latch 90. Likewise, a biasing spring 168, e.g., a coil spring, is interposed between nut housing 80 and tail end 92-2 of pivot latch 92.

While the present embodiment includes two pivot latches 90, 92 for symmetry and/or redundancy, an alternative embodiment may have, for example, only one pivot latch, e.g., pivot latch 90.

Referring again to the section view of FIG. 12, piercing module 34 is configured such that when nut housing 80 is in home position 126 and probe drive slider 38 is in the fired position 70, nut housing 80 is releaseably latched to probe drive slider 38 by pivot latches 90, 92 (shown in a locked position) so as to in turn hold probe carrier body 42 of biopsy probe assembly 14 (see FIG. 2) in a fully extended position as a result of the threaded engagement of drive spindle 36 with nut housing 80, i.e., to keep the piercing tip 62 of stylet cannula 46 of biopsy probe assembly 14 in a fixed position no matter what force is applied to piercing tip 62. Stated differently, the function of pivot latches 90, 92 is to lock probe drive slider 38 to nut housing 80 when probe drive slider 38 is at home position 126. This is done by pivot latches 90, 92 engaging a hook edge on the bottom side of slider body 110 of probe drive slider 38, as depicted in FIG. 12.

Figure 13:
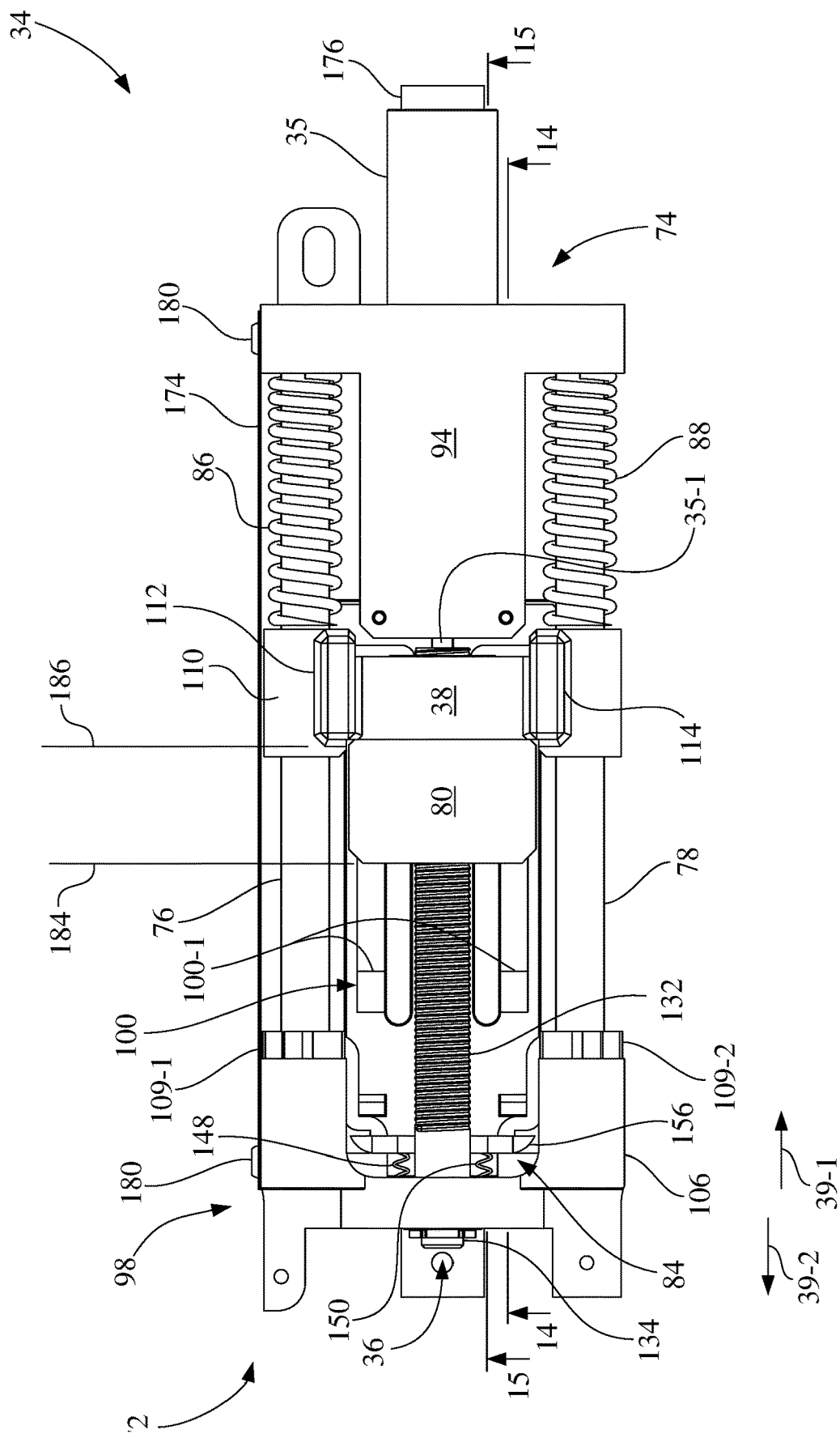
FIG. 13 is a bottom view of the piercing module showing the probe drive slider in a primed position and the nut housing in a cocking position.
Figure 14:
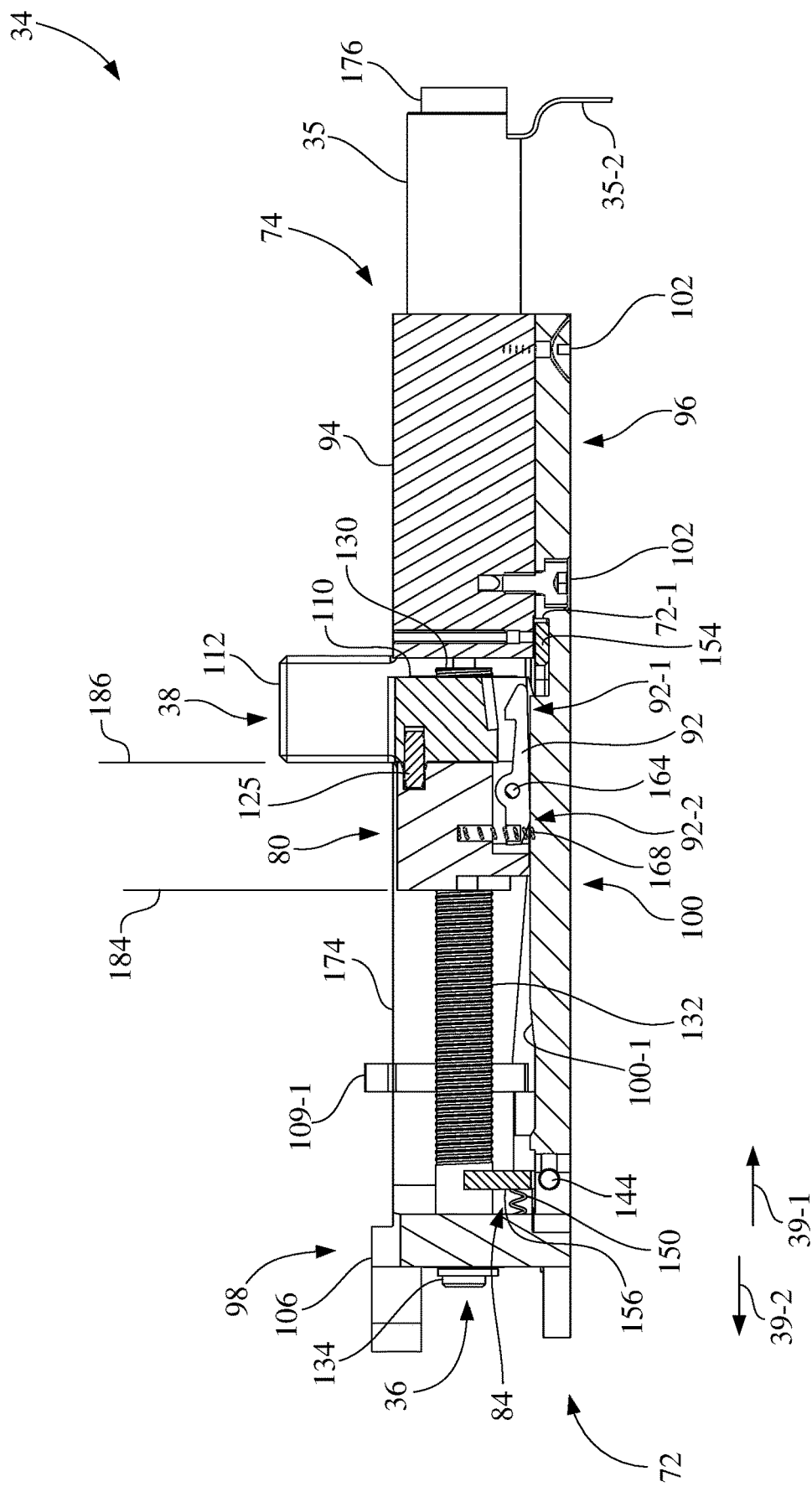
FIG. 14 is a section view of the piercing module taken along line 14-14 of FIG. 13, showing the probe drive slider in the primed position and the nut housing in the cocking position, and showing the pivot latch of the nut housing disengaged from the slider body of the probe drive slider to unlock the nut housing from the probe drive slider.
Figure 15:
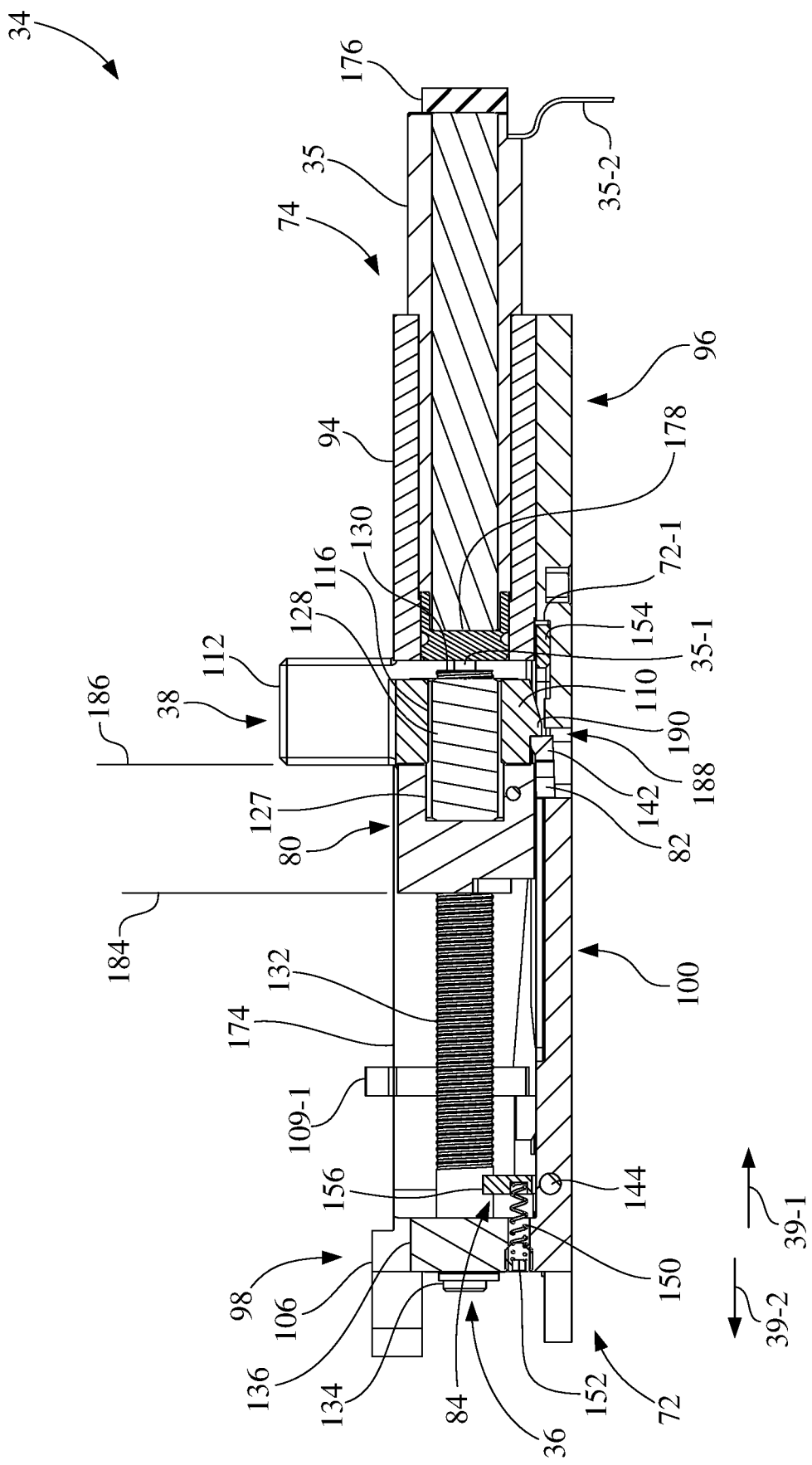
FIG. 15 is a section view of the piercing module taken along line 15-15 of FIG. 13, showing a release arm in a latch position, and with a head of the release arm engaged with a shoulder of the probe drive slider to hold the probe drive slider in the primed position.

As shown in FIG. 12, nut housing 80 also has an extended position 182 that is distal to home position 126. FIGS. 13-15 show a cocked configuration of piercing module 34, wherein nut housing 80 is in a cocking position 184 and probe drive slider 38 is in a primed position 186.

Electrically, with reference to FIG. 3, piercing module 34 may include a home position detector 170 and a primed position detector 172. Home position detector 170 may be, for example, a current/torque sensing circuit and/or a revolution counting circuit, or alternatively a proximity detector, that is configured to determine a position of nut housing 80, e.g., at home position 126, alone or in combination with controller circuit 18. Primed position detector 172 may be, for example, a current/torque sensing circuit and/or a revolution counting circuit, or alternatively a proximity sensor, that is configured to determine a position of probe drive slider 38, e.g., primed position 186, alone or in combination with controller circuit 18. While home position detector 170 and a primed position detector 172 are depicted for convenience as being a part of piercing module 34, when configured solely as current/torque sensing circuits and/or revolution counting circuits, home position detector 170 and primed position detector 172 may be incorporated, in whole or in part, in controller circuit 18.

Optionally, piercing module 34 may further include a side cover 174, a foam insulator block 176, and/or a thread ring piercing motor coupler 178.

Side cover 174 may be attached to motor housing 94 and distal block 106 via screws 180.

Foam insulator block 176, or multiple foam blocks, may be attached to the proximal end of motor 35. A function of foam insulator block 176 is to reduce operation noise. Foam insulator block 176 may be made, for example, from a foam rubber.

Thread ring piercing motor coupler 178 may act as an interface between motor 35 and motor housing 94. Motor 35 has a thread distal end which is used for mounting the thread ring piercing motor coupler 178 on motor 35. Motor coupler 178 can be positioned in multiple rotational angular positions, e.g., eight different rotational angular positions (45 degrees in between), around longitudinal axis 95. The purpose is to ensure that, during assembly, flex cable 35-2 from motor 35 is positioned relatively in the same way, and thus not twisted, so as to avoid damaging flex cable 35-2.

Referring to FIGS. 13-15, piercing module 34 is shown in cocked configuration, wherein nut housing 80 and probe drive slider 38 having been retracted in proximal direction 39-1 by rotation of drive spindle 36, so as to position nut housing 80 in cocking position 184 and to position probe drive slider 38 in primed position 186. Nut housing 80 is configured to engage and longitudinally move probe drive slider 38 to primed position 186 to thereby compress firing springs 86, 88. Primed position detector 172 may be configured to determine a position of probe drive slider 38 and to generate a primed position signal when probe drive slider 38 is in primed position 186. The primed position signal may be supplied to controller circuit 18 (see FIG. 3) for controlling the rotation of motor 35, and in turn, to control the rotation of drive spindle 36.

Referring to FIG. 14 in conjunction with FIGS. 11 and 12, as nut housing 80 longitudinally translates in proximal direction 39-1 from home position 126 (see FIG. 12), pivot latches 90, 92 ride along intermediate section 100 of piercing module frame 72 and respective ramp surfaces 100-1 so as to rotate pivot latches 90, 92 about pivot axis 138 against the biasing force of biasing springs 166, 168, so as to unlock nut housing 80 from probe drive slider 38. Stated differently, piercing module 34 is configured such that when nut housing 80 is in cocking position 184 and probe drive slider 38 is in primed position 186, pivot latches 90, 92 are released so as to release nut housing 80 from probe drive slider 38 to facilitate a return movement of nut housing 80 back to home position 126 while probe drive slider 38 remains in primed position 186.

Referring to FIG. 15 in conjunction with FIG. 11, arm biasing member 146 is configured to bias release arm 82 toward a latch position 188. When probe drive slider 38 is in primed position 186 and release arm 82 is in latch position 188, release arm 82 is biased by arm biasing member 146 so that head 142 of release arm 82 is positioned to engage a shoulder 190 of probe drive slider 38 so as to hold probe drive slider 38 in primed position 186. Also, in primed position 186, firing springs 86, 88 are compressed by the proximal movement of probe drive slider 38 from fired position 70 (see FIG. 8) to primed position 186 (see FIG. 13).

Figure 16:
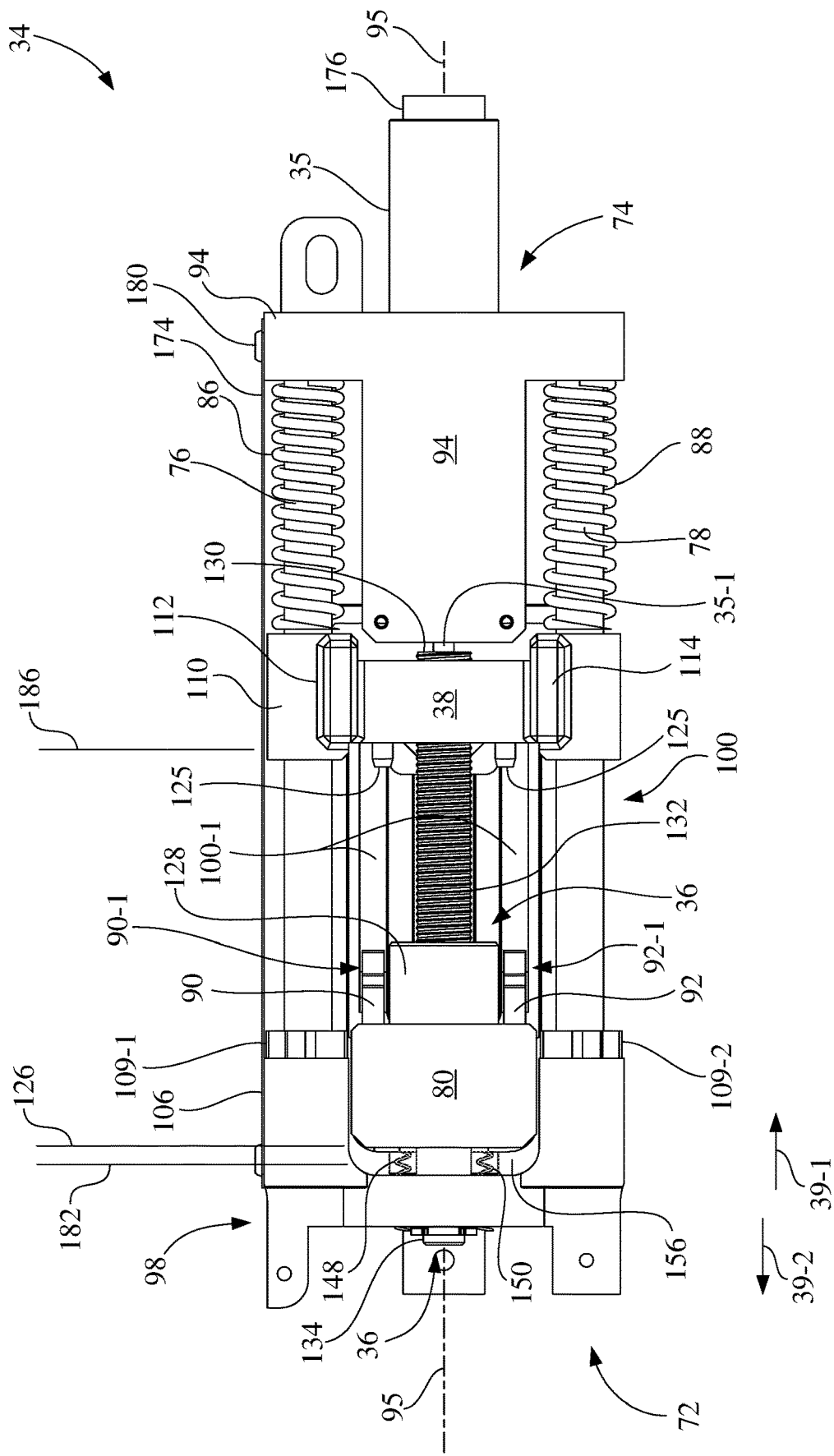
FIG. 16 is a bottom view of the piercing module showing the probe drive slider in the primed position and the nut housing in the home position.

Referring to FIG. 16, piercing module 34 is shown in pre-fire configuration, wherein nut housing 80 has been returned to home position 126 by rotation of drive spindle 36, while probe drive slider 38 is retained in primed position 186 by release arm 82. Stated differently, after probe drive slider 38 is in primed position 186, piercing module 34 is prepared for the firing of probe drive slider 38 by first returning nut housing 80 to home position 126, as depicted in FIG. 16. Home position detector 170 (see also FIG. 3) may determine a position of nut housing 80 and may generate a home position signal when nut housing 80 is in home position 126. The home position signal may be supplied to controller circuit 18, which in turn stops rotation of motor 35. When nut housing 80 is at home position 126, nut housing 80 is engaged with engagement portion 156 of release slider 84.

Figure 17:
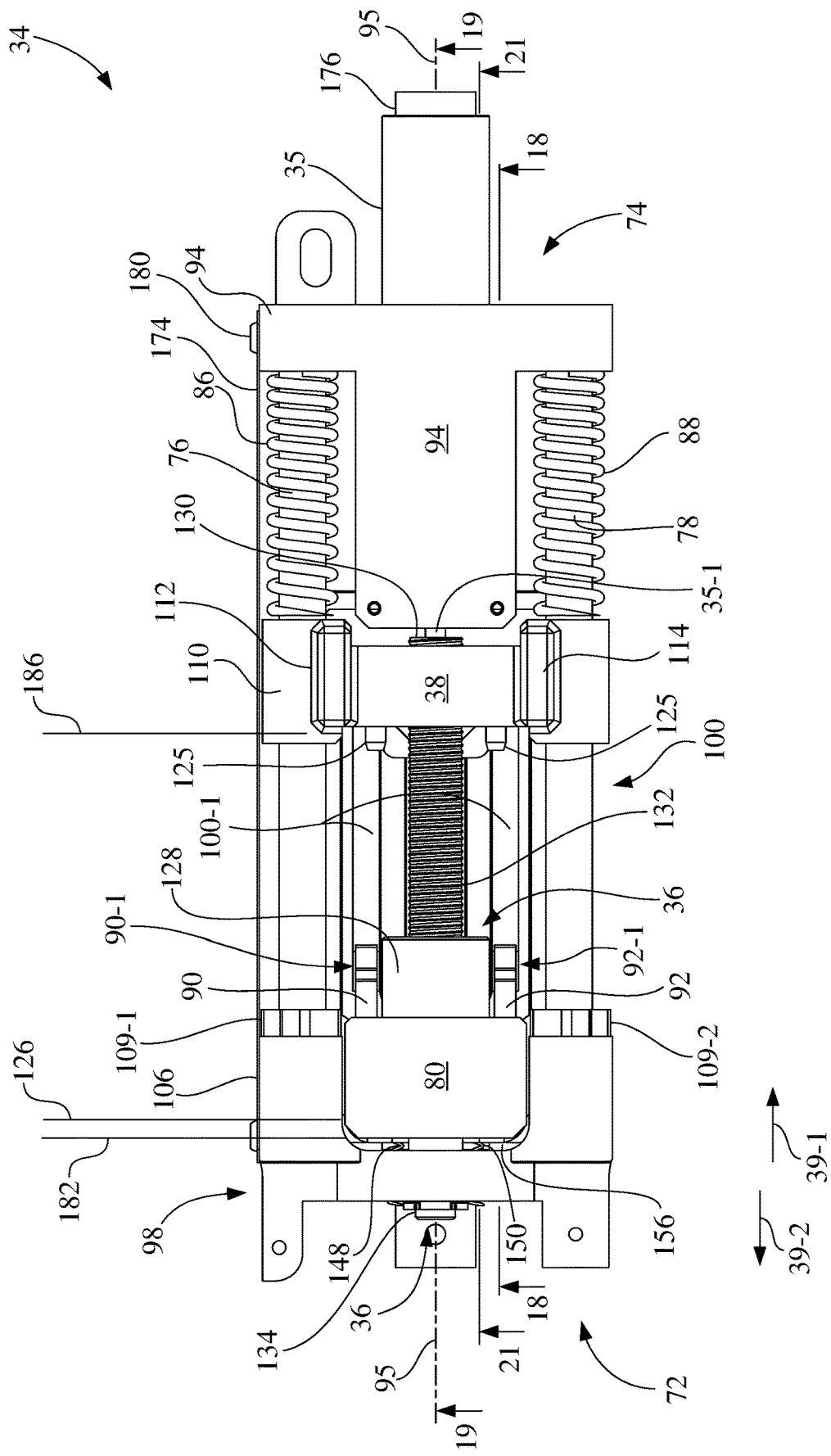
FIG. 17 is a bottom view of the piercing module showing the probe drive slider in the primed position and the nut housing in an extended position.
Figure 18:
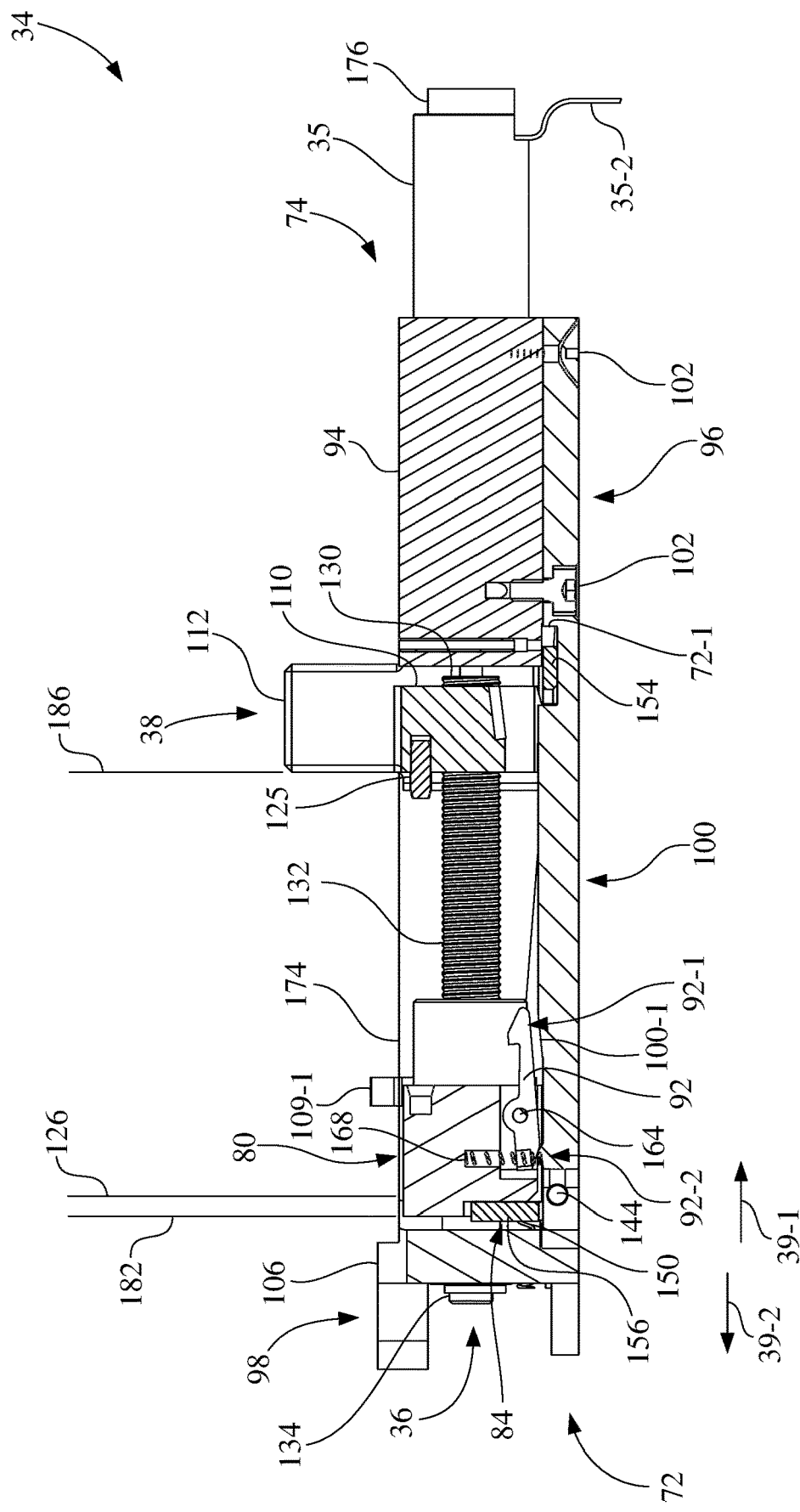
FIG. 18 is a section view of the piercing module taken along line 18-18 of FIG. 17, showing the probe drive slider in the primed position and the nut housing in the extended position.

Referring to FIGS. 17-22, piercing module 34 is shown in released-to-fire configuration, wherein nut housing 80 has been moved from home position 126 (see FIG. 16) to extended position 182 (see FIGS. 17 and 18). In the present embodiment, release slider 84 is configured to release the release arm 82 from latch position 188 (see FIG. 15) when nut housing 80 is moved from home position 126 to extended position 182 by a rotation of drive spindle 36 to in turn distally move release slider 84.

Figure 19:
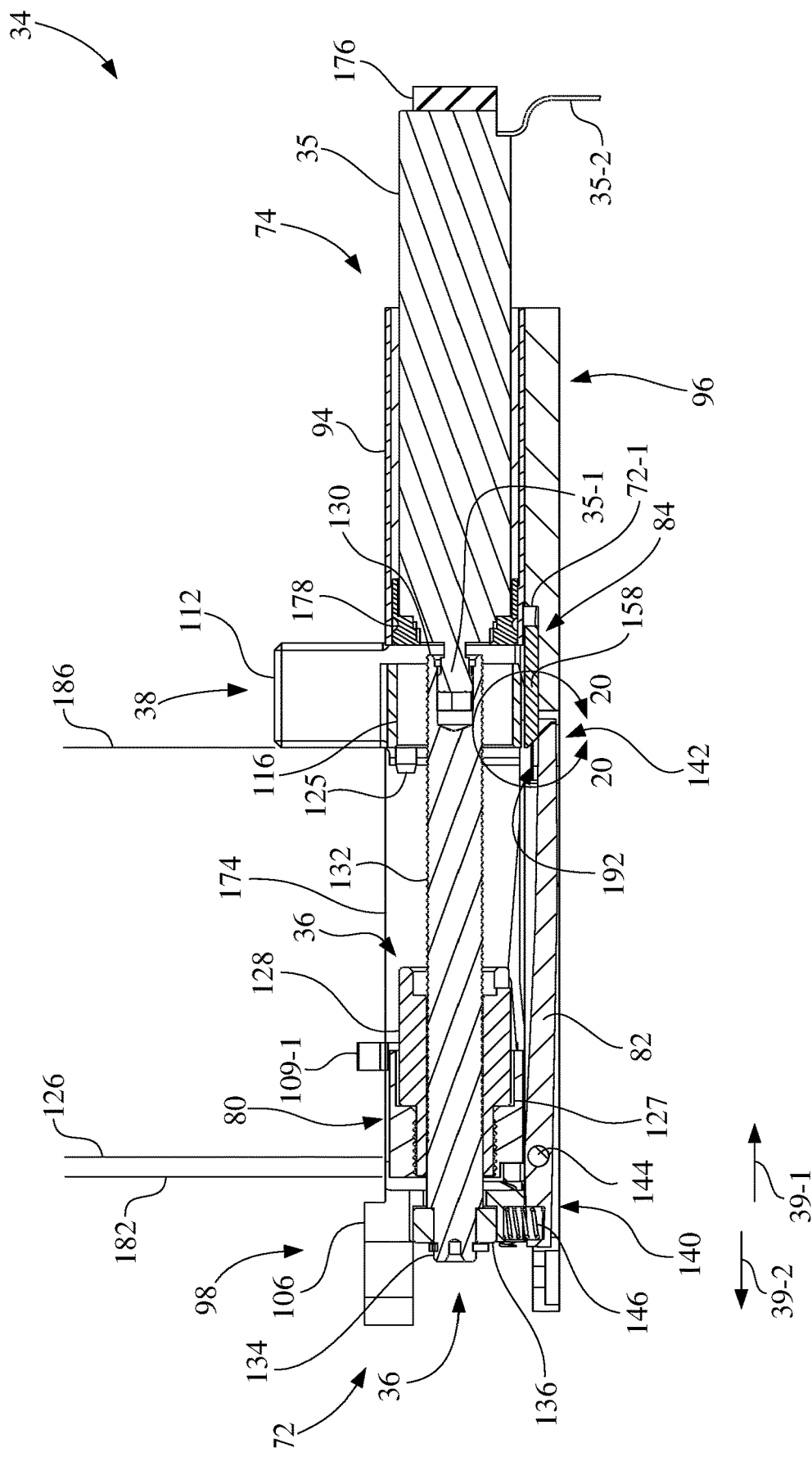
FIG. 19 is a section view of the piercing module taken along line 19-19 of FIG. 17, showing a cantilever release member of a release slider engaged with and pressing on the release arm to move the release arm to a release position.
Figure 20:
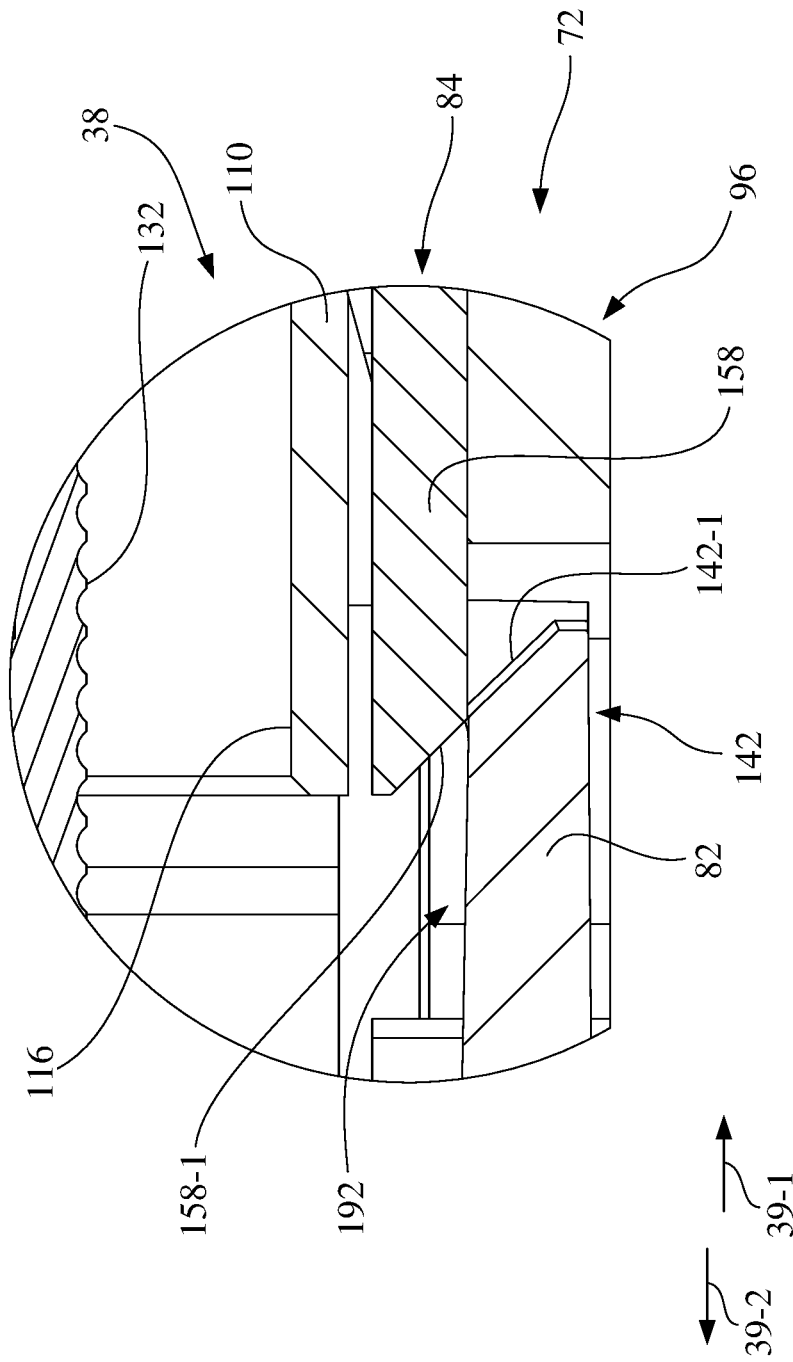
FIG. 20 is an enlargement of a portion of the section view of FIG. 19.
Figure 21:
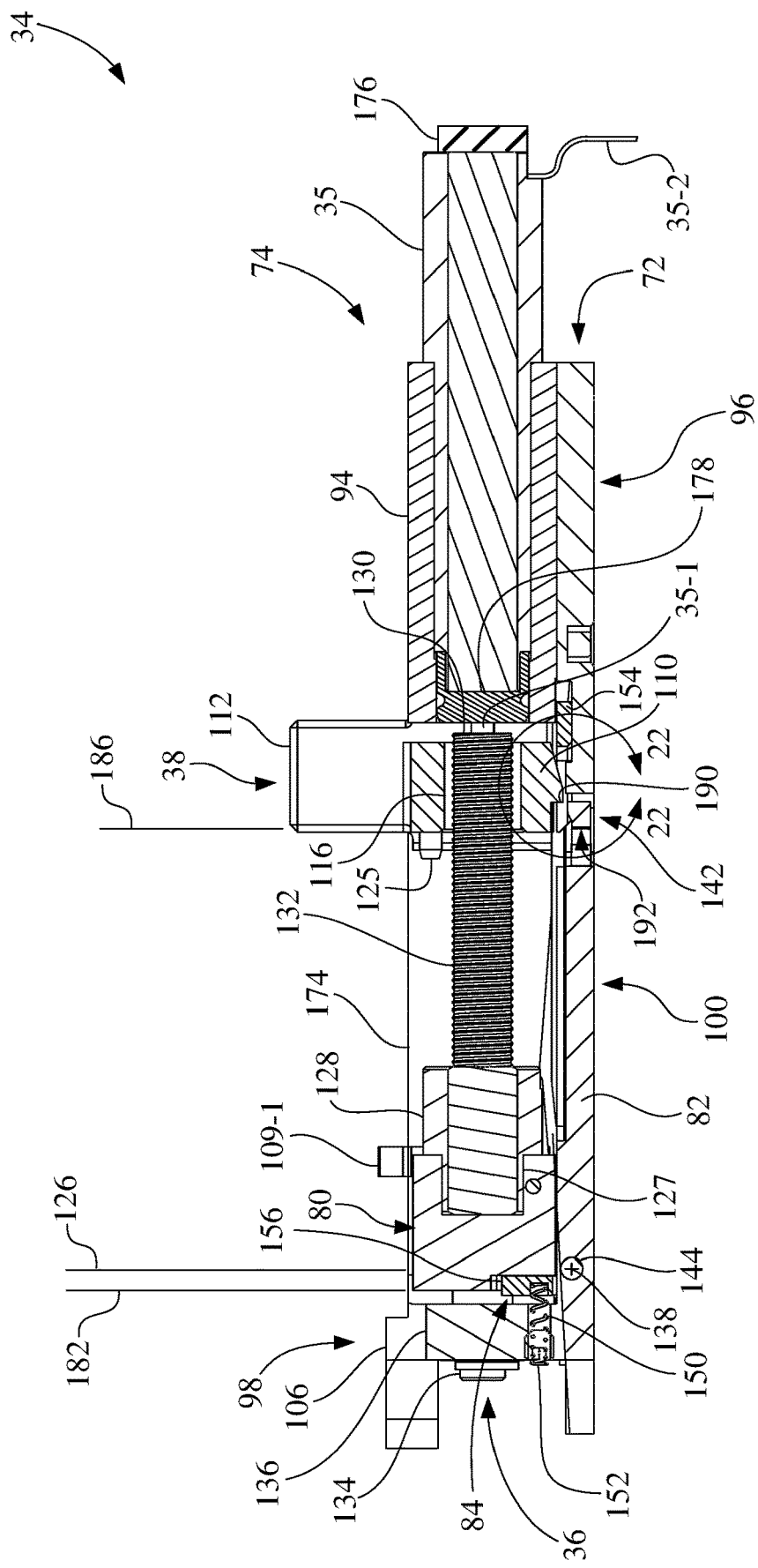
FIG. 21 is a section view of the piercing module taken along line 21-21 of FIG. 17, showing the release arm in the release position, and with the head of the release arm disengaged from the shoulder of the probe drive slider to release the probe drive slider from the primed position.
Figure 22:
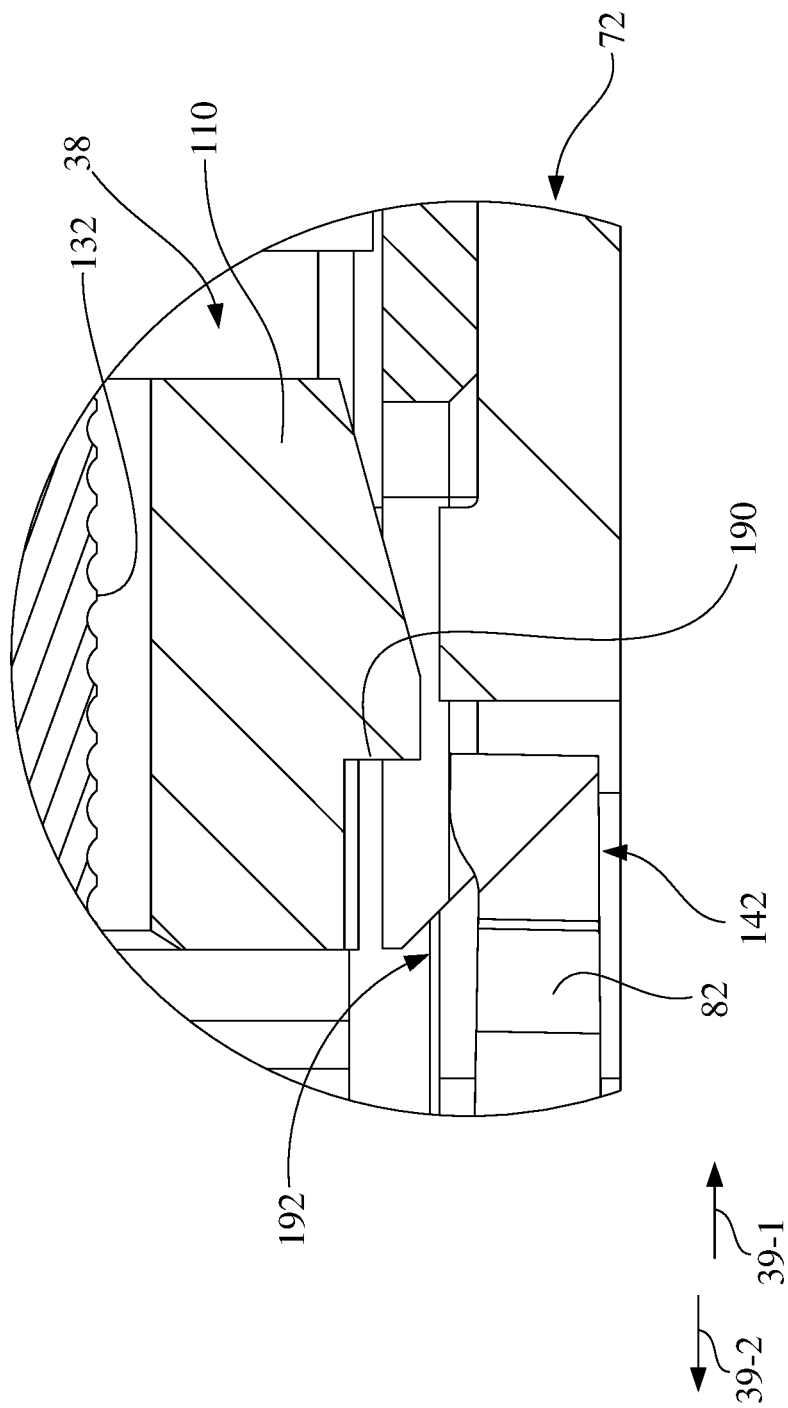
FIG. 22 is an enlargement of a portion of the section view of FIG. 21.

Referring to FIGS. 19 and 20, cantilever release member 158 of release slider 84 is configured to engage head 142 of release arm 82 so to release the release arm 82 from latch position 188 when nut housing 80 is moved from home position 126 to extended position 182. In the present embodiment, with reference to FIG. 20, cantilever release member 158 of release slider 84 has a distal beveled end surface 158-1 that is configured, e.g., in size, shape and location, to engage a corresponding proximal ramp surface 142-1 of head 142 of release arm 82. Accordingly, as nut housing 80 is moved from home position 126 to extended position 182, nut housing nut housing 80 (engaged with engagement portion 156 of release slider 84) moves release slider 84 in distal direction 39-2. As release slider 84 is moved in distal direction 39-2, distal beveled end surface 158-1 of cantilever release member 158 of release slider 84 engages proximal ramp surface 142-1 of head 142 of release arm 82 to force release arm 82 to rotate about pivot axis 138 (see FIGS. 11, 19 and 21) and in turn to force head 142 out of engagement with shoulder 190 of probe drive slider 38 (see FIGS. 15, 21 and 22) so as to position head 142 of release arm 82 in a release position 192, as shown in FIGS. 21 and 22, thereby permitting the decompression of firing springs 86, 88, which in turn fires, i.e. rapidly propels, probe drive slider 38 in distal direction 39-2 until probe drive slider 38 reaches fired position 70 (see, e.g., FIG. 8).

In operation, activation of a prime/pierce button 28-2 a first time initiates a prime (cocking) operation, and activates the motor 35 to rotate drive spindle 36, which in turn causes a piercing shot drive (nut housing 80, probe drive slider 38) to move in proximal direction 39-1 to compress firing springs 86, 88, and to latch probe drive slider 38 in primed position 186 via release arm 82. Activation of prime/pierce button 28-2 a second time initiates a pierce (firing) operation, and releases release arm 82 from probe drive slider 38 so as to fire (distally propel) probe drive slider 38 and the interfaced probe carrier body 42 of biopsy probe assembly 14. The entire prime/pierce function is driven by motor 35, which is activated by prime/pierce button 28-2, and the motions/positions are specified/programmed in the software. Prime/pierce button 28-2 is electrically acting on the assembly, not mechanically. Program instructions, e.g., software, are executed by controller circuit 18 to recognize the button press of prime/pierce button 28-2 and to send a control signal to piercing motor 35. A very small amount of rotational motion from motor 35, and in turn drive spindle 36, is needed to drive release slider 84 distally in distal direction 39-2, just a bit (e.g., 2-5 millimeters), which causes release arm 82 to disengage from probe drive slider 38, allowing firing springs 86, 88 to decompress and fire (distally propel) probe drive slider 38 forward. In the present embodiment, there is nothing that has to be done by the user simultaneously with depressing of prime/pierce button 28-2 in order to effect the prime/pierce operations to operate piercing module 34.

In the present embodiment, there are two piercing firing springs 86, 88 that drive probe drive slider 38 forward for the pierce operation. Motor 35 pulls probe drive slider 38 backward through the motion of a drive spindle 36, wherein nut 128 on drive spindle 36 drives nut housing 80 in proximal direction 39-1 to pull probe drive slider 38 back.

Probe drive slider 38 is held into position by release arm 82, and is released by distal movement of release slider 84 in distal direction 39-2 via distal movement of nut housing 80. Once the firing springs 86, 88 are compressed, probe drive slider 38 is fixed longitudinally (in primed position 186) by release arm 82. Nut housing 80 and nut 128 on drive spindle 36 are then moved longitudinally back to home position 126, i.e., the zero position, as these are used for activating the pierce (firing) operation once the user presses prime/pierce button 28-2 a second time.

Thus, nut housing 80 retracts during a prime operation, and in turn, pulls probe drive slider 38 proximally until it has moved approximately 20 millimeters and is locked in primed position 186 by release arm 82.

In primed position 186, release arm 82 moves slightly upwards, e.g., pivots around pin 144, by force from arm biasing member 146 to engage/click to probe drive slider 38 once primed. After release arm 82 holds probe drive slider 38 in primed position 186, the rotation of motor 35 and drive spindle 36 is reversed to move nut housing 80 back to home position 126. Release arm 82 holds probe drive slider 38, e.g., on two small edges that are on each side of head 142 of release arm 82. Between these two small edges is an angled surface, i.e., proximal ramp surface 142-1 of head 142. This angled surface touches an angled surface, i.e., distal beveled end surface 158-1, of release slider 84 so that these surfaces are in contact.

When the pierce (firing) operation is activated by the second press of prime/pierce button 28-2, motor 35 activates (rotates) drive spindle 36, and nut housing 80 moves a few millimeters (e.g., 2-5 mm) in distal direction 39-2 (opposite direction of prime). As nut housing 80 moves, release slider 84 correspondingly moves a few millimeters (e.g., 2-5 mm). Moving release slider 84 a few millimeters (e.g., 2-5 mm) means that the angled surface, i.e., distal beveled end surface 158-1, that is in contact with the angled surface, i.e., proximal ramp surface 142-1 of head 142 of release arm 82, and in turn, distal beveled end surface 158-1 of release slider 84 slides over proximal ramp surface 142-1 of release arm 82 and thus presses on release arm 82 such that release arm 82 disengages (e.g., two small edges on) head 142 of release arm 82 from probe drive slider 38. Probe drive slider 38, which is acted upon by the two compressed firing springs 86, 88, is then released and fired approximately 20 mm (in the present embodiment) in proximal direction 39-1, until stopped in fired position 70 by bumpers 109-1, 109-2.

Release slider 84 is by nature always moved (i.e., biased) to the right/proximal end due to release slider biasing members 148, 150 near the distal end of piercing module frame 72. In the present embodiment, this means that release slider 84 will be in contact with release arm 82 on the angled surface except for when the angled slide surfaces of release slider 84 and release arm 82 slide over each other as described above.

It is noted that, when piercing module 34 is primed (firing springs 86, 88 compressed), motor 35 is not used to move the longitudinal position of probe carrier body 42 of biopsy probe assembly 14 while firing springs 86, 88 remain compressed. However, probe carrier body 42 will move when piercing module 34 is fired due to movement of probe drive slider 38 of piercing module 34.

The following is an exemplary operational sequence utilizing controller circuit 18 along with home position detector 170 and primed position detector 172. With reference also to FIG. 3, an electrical actuator button, e.g., prime/pierce button 28-2, is configured to generate a first actuation signal and a second actuation signal. Controller circuit 18 is communicatively coupled to each of prime/pierce button 28-2, home position detector 170, primed position detector 172, and to motor 35.

A first actuation of prime/pierce button 28-2 sends the first actuation signal to controller circuit 18. Controller circuit 18 is configured to execute program instructions to receive and process the first actuation signal to cause motor 35 to rotate drive spindle 36 in a first rotational direction to longitudinally move nut housing 80 toward cocking position 184, and nut housing 80 is configured to engage and longitudinally move probe drive slider 38 to primed position 186 to thereby compress firing springs 86, 88. When probe drive slider 38 is in primed position 186, e.g., as determined by primed position detector 172: (a) head 142 of release arm 82 is positioned to hold probe drive slider 38 in primed position 186, (b) controller circuit 18 executes program instructions to receive and process the primed position signal and to cause motor 35 to rotate drive spindle 36 in a second rotational direction opposite to the first rotational direction to longitudinally move nut housing 80 from cocking position 184 toward home position 126, and (c) controller circuit 18 is configured to execute program instructions to receive and process the home position signal to stop motor 35 from rotating drive spindle 36 when nut housing 80 has arrived at home position 126.

A second actuation of prime/pierce button 28-2 sends a second actuation signal to controller circuit 18. Controller circuit 18 is configured to execute program instructions to receive and process the second actuation signal to cause motor 35 to rotate drive spindle 36 in the second rotational direction to longitudinally move nut housing 80 from home position 126 toward extended position 182 such that nut housing 80 moves release slider 84. As described in more detail above, release slider 84 is configured to operate release arm 82 to disengage head 142 of release arm 82 from probe drive slider 38 so as to release firing springs 86, 88 to decompress to in turn longitudinally move, i.e., fire, probe drive slider 38 to the fired position 70. The longitudinal movement of probe drive slider 38 causes a corresponding longitudinal movement of probe carrier body 42, stylet cannula 46 and cutter cannula 50 to an extended position to complete a piercing operation.

The following items also relate to the invention:

In one embodiment, the invention relates to a biopsy apparatus that includes a biopsy probe assembly and a piercing module. The biopsy probe assembly may have a probe carrier body, a stylet cannula, and a cutter cannula that is coaxial with the stylet cannula. Each of the stylet cannula and the cutter cannula may be coupled to the probe carrier body. The piercing module may be (configured to be) drivably coupled to the probe carrier body. The piercing module includes a piercing module frame having a proximal portion and a distal portion. A probe drive slider may be slidably coupled to the piercing module frame. The probe drive slider may be drivably coupled to the probe carrier body of the biopsy probe assembly. The probe drive slider may have a primed position and a fired position. A nut housing may be (configured to be) movably coupled to the piercing module frame. The (apparatus may be configured such that the) nut housing may be configured to have/assume a cocking position, a home position, and an extended position. A motor assembly may have a motor and a motor housing. The (apparatus may be configured such that the) motor housing may be configured to mount the motor to the piercing module frame. The motor may have a rotatable driveshaft. A drive spindle may be (configured to be) drivably coupled to the rotatable driveshaft of the motor. The drive spindle may be rotatably and drivably coupled to the nut housing. A firing spring(s) may be (configured to be) interposed between the motor housing and the probe drive slider. The (apparatus may be configured such that the) firing spring(s) may be configured to bias the probe drive slider toward the fired position. A release arm may have a mounting end portion and a head. The mounting end portion may be pivotably coupled to the piercing module frame. The release arm may be configured to have/assume a latch position, wherein when the probe drive slider is in the primed position and the release arm is in the latch position, the head of the release arm is positioned to engage the probe drive slider to hold the probe drive slider in the primed position. A release slider may be (configured to be) slidably coupled to the piercing module frame. The (apparatus may be configured such that the) release slider may be configured for engagement with the nut housing. The (apparatus may be configured such that the) release slider is configured to release the release arm from the latch position when the nut housing is moved from the home position to the extended position by a rotation of the drive spindle.

In any of the embodiments, the probe drive slider is longitudinally translatable along the piercing module frame. The nut housing is longitudinally translatable along the piercing module frame. The nut housing contains internal threads. The motor may (be configured to) be mounted to the proximal portion of the piercing module frame. The drive spindle has a proximal end, a distal end, and an elongate threaded portion. The proximal end may be (configured to be) drivably coupled to the rotatable driveshaft of the motor. The elongate threaded portion may be rotatably engaged with the internal threads of the nut housing.

In any of the embodiments, the head of the release arm is longitudinally spaced from the mounting end portion of the release arm. An arm biasing member is configured to bias the release arm toward the latch position, wherein when the probe drive slider is in the primed position and the release arm is in the latch position, the release arm is biased by the arm biasing member so that the head is positioned to engage the probe drive slider to hold the probe drive slider in the primed position.

In any of the embodiments, (the apparatus may be configured such that) a release slider biasing member may be configured to bias the release slider slidably in a proximal direction. The release slider has an engagement portion configured for engagement with the nut housing. The release slider may have a cantilever release member (and the apparatus may be configured such that the cantilever release member is) configured to engage the head of the release arm to release the release arm from the latch position when the nut housing is moved from the home position to the extended position.

In some embodiments, the probe carrier body may have a piercing module engagement opening(s). The probe drive slider may have a probe engagement protrusion(s). The (apparatus may be configured such that the) probe engagement protrusion(s) may be configured to be received in the piercing module engagement opening(s) of the probe carrier body to effect longitudinal movement of the probe carrier body in unison with longitudinal movement of the probe drive slider.

In any of the embodiments, a pivot latch may be pivotably mounted to the nut housing. The (apparatus may be configured such that the) piercing module may be configured such that when the nut housing is in the home position and the probe drive slider is in the fired position, the nut housing is releaseably latched to the probe drive slider by the pivot latch to hold the biopsy probe assembly in a fully extended position.

In any of the embodiments having a pivot latch, the (apparatus may be configured such that the) piercing module may be configured such that when the nut housing is in the cocking position and the probe drive slider is in the primed position, the pivot latch is released to release the nut housing from the probe drive slider to facilitate movement of the nut housing to the home position while the probe drive slider remains in the primed position.

In any of the embodiments, the piercing module may further include a pair of guide rods. The probe drive slider may have a pair of guide apertures configured to respectively receive the pair of guide rods in sliding engagement. The piercing module frame may have a distal block at the distal portion. The distal block may be longitudinally spaced from the motor housing, wherein the pair of guide rods are located to extend in parallel from the motor housing to the distal block.

In any of the embodiments having a distal block, the distal block of the piercing module frame may have a bearing mount. A distal end of the drive spindle may be received in the bearing mount at the distal portion of the piercing module frame.

In any of the embodiments, an electrical actuator button may be configured to generate a first actuation signal and a second actuation signal. A controller circuit may be communicatively coupled to each of the electrical actuator button and to the motor. (The controller circuit may be configured such that) A first actuation of the electrical actuator button sends the first actuation signal to the controller circuit. The controller circuit may be configured to execute program instructions to receive and process the first actuation signal to cause the motor to rotate the drive spindle in a first rotational direction to longitudinally move the nut housing toward the cocking position, and (wherein) the nut housing in turn may (be configured to) engage and longitudinally move the probe drive slider to the primed position to thereby compress the firing spring(s). (The apparatus is configured such that) When the probe drive slider is in the primed position, the head of the release arm is positioned to hold the probe drive slider in the primed position, and the controller circuit may be configured to execute program instructions to cause the motor to rotate the drive spindle in a second rotational direction opposite to the first rotational direction to longitudinally move the nut housing from the cocking position toward the home position. The controller circuit may be configured to execute program instructions to stop the motor from rotating the drive spindle when the nut housing has arrived at the home position. (The controller circuit may be configured such that) A second actuation of the electrical actuator button sends a second actuation signal to the controller circuit. The controller circuit may be configured to execute program instructions to receive and process the second actuation signal to cause the motor to rotate the drive spindle in the second rotational direction to longitudinally move the nut housing from the home position toward the extended position such that the nut housing moves the release slider. The (apparatus may be configured such that the) release slider may be configured to operate the release arm to disengage the head of the release arm from the probe drive slider so as to release the firing spring to decompress to in turn longitudinally move the probe drive slider to the fired position.

In any of the embodiments, (the apparatus may be configured such that) when the probe drive slider is drivably coupled to the probe carrier body of the biopsy probe assembly, a longitudinal movement of the probe drive slider causes a corresponding longitudinal movement of the stylet cannula and the cutter cannula of the biopsy probe assembly.

In another embodiment, the invention relates to a biopsy apparatus that includes a biopsy probe assembly and a piercing module. The biopsy probe assembly may have a probe carrier body, a stylet cannula, and a cutter cannula coaxial with the stylet cannula. Each of the stylet cannula and the cutter cannula may be (configured to be) movably coupled to the probe carrier body. A piercing module may be (configured to be) drivably coupled to the probe carrier body. The piercing module may include a piercing module frame that may have a proximal portion and a distal portion. A probe drive slider may be (configured to be) slidably coupled to the piercing module frame. The probe drive slider may be configured for drivable coupling to the probe carrier body of the biopsy probe assembly. The (apparatus may be configured such that the) probe drive slider may be longitudinally translatable along the piercing module frame. The (apparatus may be configured such that the) probe drive slider may be configured to have/assume a primed position and a fired position. (The apparatus may be configured such that) A nut housing may be movably coupled to the piercing module frame. The nut housing may contain internal threads. The (apparatus may be configured such that the) nut housing may be longitudinally translatable along the piercing module frame. The nut housing may (be configured to) have/assume a cocking position, a home position, and an extended position. A motor assembly may have a motor and a motor housing. The motor housing may be configured to mount the motor to the proximal portion of the piercing module frame. The motor may have a rotatable driveshaft. A drive spindle may have a proximal end, a distal end, and an elongate threaded portion. The proximal end may be (configured to be) drivably coupled to the rotatable driveshaft of the motor. The elongate threaded portion may be rotatably engaged with the internal threads of the nut housing. The firing spring may be interposed between the motor housing and the probe drive slider. The (apparatus may be configured such that the) firing spring may be configured to bias the probe drive slider toward the fired position. A release arm may have a distal mounting end portion and a proximal head. The proximal head may be longitudinally spaced from the distal mounting end portion. The distal mounting end portion may be (configured to be) pivotably coupled to the distal portion of the piercing module frame. The (apparatus may be configured such that the) release arm may be (configured to be) biased by a first biasing spring toward a latch position, wherein when the probe drive slider is in the primed position and the release arm is in the latch position, the proximal head of the release arm may be positioned to engage the probe drive slider to hold the probe drive slider in the primed position. (The apparatus may be configured such that) A release slider may be slidably coupled to the piercing module frame and may be biased by a second biasing spring in a proximal direction. The release slider may have an engagement portion configured for engagement with the nut housing. The (apparatus may be configured such that the) release slider may be configured to release the release arm from the latch position when the nut housing is moved from the home position to the extended position by rotation of the drive spindle.

In any of the embodiments, the probe carrier body may have a piercing module engagement opening. The probe drive slider may have a probe engagement protrusion. The (apparatus may be configured such that the) probe engagement protrusion may be configured to be received in the piercing module engagement opening of the probe carrier body to effect longitudinal movement of the probe carrier body in unison with longitudinal movement of the probe drive slider.

In any of the embodiments, a pivot latch pivotably may be mounted to the nut housing. The (apparatus may be configured such that the) piercing module may be configured such that when the nut housing may be in the home position and the probe drive slider may be in the fired position, the nut housing may be releaseably latched to the probe drive slider by the pivot latch to hold the biopsy probe assembly in a fully extended position.

In the embodiment according to the preceding paragraph, the (apparatus may be configured such that the) piercing module may be configured such that when the nut housing may be in the cocking position and the probe drive slider may be in the primed position, the pivot latch may be released to release the nut housing from the probe drive slider to facilitate movement of the nut housing to the home position while the probe drive slider remains in the primed position.

In any of the embodiments, the piercing module may further comprise at least one, and perhaps a pair of guide rods. The probe drive slider may have a pair of guide apertures that may be configured to respectively receive the pair of guide rods in sliding engagement (and the apparatus may be configured accordingly). The piercing module frame may have a distal block at the distal portion. The distal block may be longitudinally spaced from the motor housing, wherein the pair of guide rods are located to extend in parallel from the motor housing to the distal block.

In the embodiment according to the preceding paragraph, the distal block of the piercing module frame may have a bearing mount, and the distal end of the drive spindle may be received in the bearing mount at the distal portion of the piercing module frame.

In any of the embodiments, an electrical actuator button may be configured to generate a first actuation signal and a second actuation signal. A home position detector may be configured to generate a home position signal when the nut housing may be in the home position. A primed position detector may be configured to generate a primed position signal when the probe drive slider may be in the primed position. A controller circuit may be communicatively coupled to each of the electrical actuator button, the home position detector, the primed position detector, and to the motor. The controller circuit may be configured to receive and process the first actuation signal, the second actuation signal, the home position signal, and the primed position signal, and to execute program instructions to control the operation of the motor. (The controller circuit may be configured such that) A first actuation of the electrical actuator button sends the first actuation signal to the controller circuit to cause the motor to rotate the drive spindle in a first rotational direction to longitudinally move the nut housing toward the cocking position, and the nut housing in turn may be configured to engage and longitudinally move the probe drive slider to the primed position to thereby compress the firing spring. (The apparatus may be configured such that) After the probe drive slider is in the primed position as determined by the primed position detector, the proximal head of the release arm may be positioned by the first biasing spring to hold the probe drive slider in the primed position. The controller circuit executes program instructions to cause the motor to rotate the driveshaft in a second rotational direction opposite to the first rotational direction, (wherein) the nut housing may be/to longitudinally moved from the cocking position toward the home position as the drive spindle is rotated by the driveshaft of the motor, and thereafter the controller circuit stops the motor from rotating the drive shaft when the nut housing has arrived at the home position as determined by the home position detector. (The apparatus may be configured such that) A second actuation of the electrical actuator button sends the second actuation signal to the controller circuit to cause the motor to further rotate the drive spindle in the second rotational direction to move the nut housing from the home position longitudinally toward the extended position, wherein the nut housing in turn longitudinally moves the release slider. The (apparatus may be configured such that) release slider may be configured to disengage the proximal head of the release arm from the probe drive slider such that the firing spring decompresses to longitudinally move the probe drive slider to the fired position.

In another embodiment, the invention relates to a biopsy driver for drivable coupling to a biopsy probe assembly that may have a probe carrier body that carries a stylet cannula. The biopsy driver includes a piercing module frame having a proximal portion and a distal portion. A probe drive slider may be slidably coupled to the piercing module frame. The (biopsy driver may be configured such that the) probe drive slider may be configured for drivable coupling to the probe carrier body of the biopsy probe assembly. The (biopsy driver may be configured such that the) probe drive slider is configured to have/assume a primed position and a fired position. A nut housing may be movably coupled to the piercing module frame. The (biopsy driver may be configured such that the) nut housing is configured to have/assume a cocking position, a home position, and an extended position. A motor assembly may have a motor and a motor housing. The motor housing may be configured to mount the motor to the piercing module frame. The motor has a rotatable driveshaft. A drive spindle may be drivably coupled to the rotatable driveshaft of the motor. The drive spindle may be rotatably coupled to the nut housing. A firing spring(s) may be interposed between the motor housing and the probe drive slider. The (biopsy driver may be configured such that the) firing spring(s) may be configured to bias the probe drive slider toward the fired position. A release arm may have a mounting end portion and a head. The (biopsy driver may be configured such that the) mounting end portion may be pivotably coupled to the distal portion of the piercing module frame. The (biopsy driver may be configured such that the) release arm may be biased by a biasing member toward a latch position, wherein when the probe drive slider is in the primed position and the release arm is in the latch position, the head of the release arm is configured to engage the probe drive slider to hold the probe drive slider in the primed position. (The biopsy driver may be configured such that) A release slider may be slidably coupled to the piercing module frame. The release slider has an engagement portion configured for engagement with the nut housing. The (biopsy driver may be configured such that the) release slider may be configured to release the release arm from the latch position when the nut housing is moved from the home position to the extended position by rotation of the drive spindle by the motor.

In the embodiment according to the preceding paragraph, (the biopsy driver may be configured such that) a release slider biasing member(s) may be configured to bias the release slider slidably in a proximal direction. The release slider may have an engagement portion configured for engagement with the nut housing. The release slider may have a cantilever release member that extends in a distal direction and (the biopsy driver may be configured such that the cantilever release member) may be configured to engage the head of the release arm to release the release arm from the latch position when the nut housing is moved in the distal direction from the home position to the extended position.

As used herein, "slightly", "approximately", and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

Also, as used herein, the term "coupled", and its derivatives, is intended to embrace any operationally functional connection, i.e., a direct connection or an indirect connection.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A biopsy apparatus, comprising:
  a biopsy probe assembly having a probe carrier body, a stylet cannula, and a cutter cannula that is coaxial with the stylet cannula, wherein each of the stylet cannula and the cutter cannula is coupled to the probe carrier body; and
  a piercing module drivably coupled to the probe carrier body, the piercing module comprising:
  a piercing module frame having a proximal portion and a distal portion,
  a probe drive slider slidably coupled to the piercing module frame, the probe drive slider being drivably coupled to the probe carrier body of the biopsy probe assembly, the probe drive slider having a primed position and a fired position,
  a nut housing movably coupled to the piercing module frame, the nut housing having a cocking position, a home position, and an extended position, wherein the nut housing is configured to engage and longitudinally move the probe drive slider to the primed position when the nut housing is moved to the cocking position,
  a motor assembly having a motor and a motor housing, the motor housing configured to mount the motor to the piercing module frame, the motor having a rotatable driveshaft,
  a drive spindle drivably coupled to the rotatable driveshaft of the motor, the drive spindle being rotatably and drivably coupled to the nut housing;
  a firing spring interposed between the motor housing and the probe drive slider, the firing spring configured to bias the probe drive slider toward the fired position;
  a release arm having a mounting end portion and a head, the mounting end portion being pivotably coupled to the piercing module frame, the release arm having a latch position, wherein when the probe drive slider is in the primed position and the release arm is in the latch position, the head of the release arm is positioned to engage the probe drive slider to hold the probe drive slider in the primed position; and a release slider slidably coupled to the piercing module frame, the release slider configured for engagement with the nut housing, the release slider configured to release the release arm from the latch position when the nut housing is moved distally from the home position to the extended position by a rotation of the drive spindle.

2. The biopsy apparatus according to claim 1, wherein:
the probe drive slider is longitudinally translatable along the piercing module frame;
the nut housing is longitudinally translatable along the piercing module frame, the nut housing containing internal threads;
the motor is mounted to the proximal portion of the piercing module frame; and
the drive spindle has a proximal end, a distal end, and an elongate threaded portion, the proximal end being drivably coupled to the rotatable driveshaft of the motor, the elongate threaded portion being rotatably engaged with the internal threads of the nut housing.

3. The biopsy apparatus according to claim 1, wherein the head of the release arm is longitudinally spaced from the mounting end portion of the release arm, and further comprising an arm biasing member configured to bias the release arm toward the latch position, wherein when the probe drive slider is in the primed position and the release arm is in the latch position, the release arm is biased by the arm biasing member so that the head is positioned to engage the probe drive slider to hold the probe drive slider in the primed position.

4. The biopsy apparatus according to claim 1, comprising a release slider biasing member configured to bias the release slider slidably in a proximal direction, the release slider having an engagement portion configured for engagement with the nut housing, and the release slider having a cantilever release member configured to engage the head of the release arm to release the release arm from the latch position when the nut housing is moved from the home position to the extended position.

5. The biopsy apparatus according to claim 1, wherein:
the probe carrier body has a piercing module engagement opening; and
the probe drive slider has a probe engagement protrusion, the probe engagement protrusion configured to be received in the piercing module engagement opening of the probe carrier body to effect longitudinal movement of the probe carrier body in unison with longitudinal movement of the probe drive slider.

6. The biopsy apparatus according to claim 1, comprising a pivot latch pivotably mounted to the nut housing, the piercing module configured such that when the nut housing is in the home position and the probe drive slider is in the fired position, the nut housing is releaseably latched to the probe drive slider by the pivot latch to hold the biopsy probe assembly in a fully extended position.

7. The biopsy apparatus according to claim 6, the piercing module configured such that when the nut housing is in the cocking position and the probe drive slider is in the primed position, the pivot latch is released to release the nut housing from the probe drive slider to facilitate movement of the nut housing to the home position while the probe drive slider remains in the primed position.

8. The biopsy apparatus according to claim 1, the piercing module further comprising:
a pair of guide rods;
the probe drive slider having a pair of guide apertures configured to respectively receive the pair of guide rods in sliding engagement; and
the piercing module frame having a distal block at the distal portion, the distal block being longitudinally spaced from the motor housing, wherein the pair of guide rods are located to extend in parallel from the motor housing to the distal block.

9. The biopsy apparatus according to claim 8, wherein the distal block of the piercing module frame has a bearing mount, and a distal end of the drive spindle is received in the bearing mount at the distal portion of the piercing module frame.

10. The biopsy apparatus according to claim 1, comprising:
an electrical actuator button configured to generate a first actuation signal and a second actuation signal;
a controller circuit communicatively coupled to each of the electrical actuator button and to the motor, wherein:
a first actuation of the electrical actuator button sends the first actuation signal to the controller circuit, the controller circuit configured to execute program instructions to receive and process the first actuation signal to cause the motor to rotate the drive spindle in a first rotational direction to longitudinally move the nut housing toward the cocking position, the nut housing in turn configured to engage and longitudinally move the probe drive slider to the primed position to thereby compress the firing spring,
wherein when the probe drive slider is in the primed position:
the head of the release arm is positioned to hold the probe drive slider in the primed position, and
the controller circuit configured to execute program instructions to cause the motor to rotate the drive spindle in a second rotational direction opposite to the first rotational direction to longitudinally move the nut housing from the cocking position toward the home position, and the controller circuit configured to execute program instructions to stop the motor from rotating the drive spindle when the nut housing has arrived at the home position; and
a second actuation of the electrical actuator button sends the second actuation signal to the controller circuit, the controller circuit configured to execute program instructions to receive and process the second actuation signal to cause the motor to rotate the drive spindle in the second rotational direction to longitudinally move the nut housing from the home position toward the extended position such that the nut housing moves the release slider, the release slider configured to operate the release arm to disengage the head of the release arm from the probe drive slider so as to release the firing spring to decompress to in turn longitudinally move the probe drive slider to the fired position.

11. The biopsy apparatus according to claim 1, wherein when the probe drive slider is drivably coupled to the probe carrier body of the biopsy probe assembly, a longitudinal movement of the probe drive slider causes a corresponding longitudinal movement of the stylet cannula and the cutter cannula of the biopsy probe assembly.

12. A biopsy apparatus, comprising:
a biopsy probe assembly having a probe carrier body, a stylet cannula, and a cutter cannula coaxial with the stylet cannula, each of the stylet cannula and the cutter cannula being movably coupled to the probe carrier body; and a piercing module drivably coupled to the probe carrier body, the piercing module comprising:

a piercing module frame having a proximal portion and a distal portion;

a probe drive slider slidably coupled to the piercing module frame, the probe drive slider configured for drivable coupling to the probe carrier body of the biopsy probe assembly, the probe drive slider being longitudinally translatable along the piercing module frame, the probe drive slider having a primed position and a fired position, a nut housing movably coupled to the piercing module frame, the nut housing containing internal threads, the nut housing being longitudinally translatable along the piercing module frame, the nut housing having a cocking position, a home position, and an extended position, wherein the nut housing is configured to engage and longitudinally move the probe drive slider to the primed position when the nut housing is moved to the cocking position, a motor assembly having a motor and a motor housing, the motor housing configured to mount the motor to the proximal portion of the piercing module frame, the motor having a rotatable driveshaft, a drive spindle having a proximal end, a distal end, and an elongate threaded portion, the proximal end being drivably coupled to the rotatable driveshaft of the motor, the elongate threaded portion being rotatably engaged with the internal threads of the nut housing;

a firing spring interposed between the motor housing and the probe drive slider, the firing spring configured to bias the probe drive slider toward the fired position;

a release arm having a distal mounting end portion and a proximal head, the proximal head being longitudinally spaced from the distal mounting end portion, the distal mounting end portion being pivotably coupled to the distal portion of the piercing module frame, the release arm being biased by a first biasing spring toward a latch position, wherein when the probe drive slider is in the primed position and the release arm is in the latch position, the proximal head of the release arm is positioned to engage the probe drive slider to hold the probe drive slider in the primed position;

a release slider slidably coupled to the piercing module frame and biased by a second biasing spring in a proximal direction, the release slider having an engagement portion configured for engagement with the nut housing, the release slider configured to release the release arm from the latch position when the nut housing is moved distally from the home position to the extended position by rotation of the drive spindle.

13. The biopsy apparatus according to claim 12, wherein:
the probe carrier body has a piercing module engagement opening; and
the probe drive slider has a probe engagement protrusion, the probe engagement protrusion configured to be received in the piercing module engagement opening of the probe carrier body to effect longitudinal movement of the probe carrier body in unison with longitudinal movement of the probe drive slider.

14. The biopsy apparatus according to claim 12, comprising a pivot latch pivotably mounted to the nut housing, the piercing module configured such that when the nut housing is in the home position and the probe drive slider is in the fired position, the nut housing is releaseably latched to the probe drive slider by the pivot latch to hold the biopsy probe assembly in a fully extended position.

15. The biopsy apparatus according to claim 14, the piercing module configured such that when the nut housing is in the cocking position and the probe drive slider is in the primed position, the pivot latch is released to release the nut housing from the probe drive slider to facilitate movement of the nut housing to the home position while the probe drive slider remains in the primed position.

16. The biopsy apparatus according to claim 12, the piercing module further comprising:
a pair of guide rods;
the probe drive slider having a pair of guide apertures configured to respectively receive the pair of guide rods in sliding engagement;
the piercing module frame having a distal block at the distal portion, the distal block being longitudinally spaced from the motor housing, wherein the pair of guide rods are located to extend in parallel from the motor housing to the distal block.

17. The biopsy apparatus according to claim 16, wherein the distal block of the piercing module frame has a bearing mount, and the distal end of the drive spindle is received in the bearing mount at the distal portion of the piercing module frame.

18. The biopsy apparatus according to claim 12, comprising:
an electrical actuator button configured to generate a first actuation signal and a second actuation signal;
a home position detector configured to generate a home position signal when the nut housing is in the home position;
a primed position detector configured to generate a primed position signal when the probe drive slider is in the primed position;
a controller circuit communicatively coupled to each of the electrical actuator button, the home position detector, the primed position detector, and to the motor, the controller circuit configured to receive and process the first actuation signal, the second actuation signal, the home position signal, and the primed position signal, and to execute program instructions to control the operation of the motor, wherein:
a first actuation of the electrical actuator button sends the first actuation signal to the controller circuit to cause the motor to rotate the drive spindle in a first rotational direction to longitudinally move the nut housing toward the cocking position, the nut housing in turn configured to engage and longitudinally move the probe drive slider to the primed position to thereby compress the firing spring, wherein after the probe drive slider is in the primed position as determined by the primed position detector:
the proximal head of the release arm is positioned by the first biasing spring to hold the probe drive slider in the primed position, and
the controller circuit executes program instructions to cause the motor to rotate the driveshaft in a second rotational direction opposite to the first rotational direction, wherein the nut housing is longitudinally moved from the cocking position toward the home position as the drive spindle is rotated by the driveshaft of the motor, and thereafter the controller circuit stops the motor from rotating the drive-shaft when the nut housing has arrived at the home position as determined by the home position detector; and
a second actuation of the electrical actuator button sends the second actuation signal to the controller circuit to cause the motor to further rotate the drive spindle in the second rotational direction to move the nut housing from the home position longitudinally toward the extended position, wherein the nut housing in turn longitudinally moves the release slider, the release slider configured to disengage the proximal head of the release arm from the probe drive slider such that the firing spring decompresses to longitudinally move the probe drive slider to the fired position.

19. A biopsy driver for drivable coupling to a biopsy probe assembly having a probe carrier body that carries a stylet cannula, comprising:

a piercing module frame having a proximal portion and a distal portion;

a probe drive slider slidably coupled to the piercing module frame, the probe drive slider configured for drivable coupling to the probe carrier body of the biopsy probe assembly, the probe drive slider having a primed position and a fired position;

a nut housing movably coupled to the piercing module frame, the nut housing having a cocking position, a home position, and an extended position, wherein the nut housing is configured to engage and longitudinally move the probe drive slider to the primed position when the nut housing is moved to the cocking position;

a motor assembly having a motor and a motor housing, the motor housing configured to mount the motor to the piercing module frame, the motor having a rotatable driveshaft;

a drive spindle drivably coupled to the rotatable driveshaft of the motor, the drive spindle being rotatably coupled to the nut housing;

a firing spring interposed between the motor housing and the probe drive slider, the firing spring configured to bias the probe drive slider toward the fired position;

a release arm having a mounting end portion and a head, the mounting end portion being pivotably coupled to the distal portion of the piercing module frame, the release arm being biased by a biasing member toward a latch position, wherein when the probe drive slider is in the primed position and the release arm is in the latch position, the head of the release arm configured to engage the probe drive slider to hold the probe drive slider in the primed position; and a release slider slidably coupled to the piercing module frame, the release slider having an engagement portion configured for engagement with the nut housing, the release slider configured to release the release arm from the latch position when the nut housing is moved distally from the home position to the extended position by rotation of the drive spindle by the motor.

20. The biopsy driver according to claim 19, comprising a release slider biasing member configured to bias the release slider slidably in a proximal direction, and the release slider having a cantilever release member that extends in a distal direction and is configured to engage the head of the release arm to release the release arm from the latch position when the nut housing is moved in the distal direction from the home position to the extended position.

* * * * *